US006742639B2

United States Patent
Aikawa et al.

(10) Patent No.: US 6,742,639 B2
(45) Date of Patent: Jun. 1, 2004

(54) CONTROL APPARATUS FOR CONTROLLING A SHIFT OPERATION IN AN AUTOMATIC TRANSMISSION

(75) Inventors: Akira Aikawa, Aichi-ken (JP); Hiroaki Kato, Kuwana (JP); Katsutoshi Sato, Toyoake (JP); Yasuo Shirai, Chiryu (JP); Atsumi Ohara, Ibaraki (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/319,549

(22) Filed: Dec. 16, 2002

(65) Prior Publication Data

US 2003/0130078 A1 Jul. 10, 2003

(30) Foreign Application Priority Data

Dec. 17, 2001 (JP) ........................................ 2001-382878

(51) Int. Cl.[7] ............................................... F16H 61/06
(52) U.S. Cl. .................... 192/3.61; 192/3.63; 192/48.9; 192/87.14; 477/79
(58) Field of Search ............................... 192/3.61, 3.63, 192/48.9, 87.14; 477/79, 133

(56) References Cited

U.S. PATENT DOCUMENTS

| | | | | |
|---|---|---|---|---|
| 4,653,351 A | * | 3/1987 | Downs et al. | 477/148 |
| 4,905,545 A | * | 3/1990 | Leising et al. | 477/133 |
| 5,079,970 A | * | 1/1992 | Butts et al. | 477/102 |
| 6,319,170 B1 | * | 11/2001 | Hubbard et al. | 477/107 |
| 6,328,673 B1 | * | 12/2001 | Monowa et al. | 477/120 |
| 6,368,249 B1 | * | 4/2002 | Hubbard | 477/121 |
| 6,415,213 B1 | * | 7/2002 | Hubbard et al. | 701/51 |

FOREIGN PATENT DOCUMENTS

JP          10-153257 A          6/1998

* cited by examiner

Primary Examiner—Saul Rodriguez
(74) Attorney, Agent, or Firm—Burns, Doane, Swecker & Mathis, L.L.P.

(57) ABSTRACT

A control apparatus for controlling a shift operation sets an output Mout from a reference model M(s), which is ideally changed, as a target slip amount of a feedback controller Cpi(s). The controller Cpi(s) controls torque transmitted to an off-going friction engagement element for matching a control slip amount sp with the target slip amount. The characteristics of the controller Cpi(s) is determined for optimally performing a clutch-to-clutch shift operation during a lock-up clutch being engaged. When the lock-up clutch has been disengaged, an input shaft rotation speed is filtered by a notch filter NF for removing a frequency component in a predetermined frequency domain, wherein the control slip amount sp is obtained based upon the filtered input shaft rotation speed.

4 Claims, 16 Drawing Sheets

CONTROL APPARATUS FOR CONTROLLING A SHIFT OPERATION IN AN AUTOMATIC TRANSMISSION

CROSS REFERENCE TO RELATED APPLICATIONS

This application is based on and claims priority under 35 U.S.C. § 119 with respect to a Japanese Patent Application 2001-382878, filed on Dec. 17, 2001, the entire content of which is incorporated herein by reference.

FIELD OF THE INVENTION

This invention generally relates to a control apparatus for controlling a shift operation in a vehicle automatic transmission assembled to a torque converter with a lock-up clutch and capable of automatically switching a shift stage. The shift operation is actually controlled by engaging/disengaging plural friction engagement elements assembled in the automatic transmission. More particularly, this invention pertains to a control apparatus capable of reducing torque fluctuation of an output shaft assembled in an automatic transmission, which may occur along with a clutch-to-clutch shift operation, wherein a good shift feeling can be attained.

BACKGROUND OF THE INVENTION

According to a conventional automatic transmission, torque transmitted to an off-going friction engagement element which is adapted to be disengaged along with shift operation in the automatic transmission is required to be reduced corresponding to increase of torque transmitted to an on-coming friction engagement element which is adapted to be engaged along with the shift operation. A one-way clutch has been employed for reducing the torque transmitted to the off-going friction engagement element. However, somewhat recent developments have led to an automatic transmission in which a clutch-to-clutch shift operation is performed by controlling hydraulic pressure of oil supplied to the friction engagement element as a substitute for the one-way clutch.

According to the above-described clutch-to-clutch shift operation, torque of an output shaft of the automatic transmission suddenly may fluctuate and a shift feeling may become worse unless the hydraulic pressure control can be executed properly. More specifically, assuming that a timing to reduce the torque transmitted to the off-going friction engagement element is delayed relative to a timing to increase the torque transmitted to the on-coming friction engagement element, a so-called interlocked condition may be established in the transmission so that the torque of the output shaft may be rapidly decreased. On the other hand, assuming that the timing to reduce the torque transmitted to the off-going friction engagement element is too premature relative to the timing to increase the torque transmitted to the on-coming friction engagement element, a rotation speed (hereinafter, referred to as RPM) of an input shaft of the transmission, i.e. a rotation speed of a turbine wheel may be increased. Therefore, the torque of the output shaft may be rapidly reduced.

In order to solve the aforementioned problem, this type of automatic transmission has been considered to perform a so-called slip amount control, whereby the increase of the torque transmitted to the on-coming friction engagement element is controlled to wait for the time to be started while generating a slip by reducing the torque transmitted to the off-going friction engagement element. The slip amount control can be executed by a controller (i.e. a feedback controller) which can perform a proportional-plus-integral control for controlling the torque transmitted to the off-going friction engagement element for matching the slip amount with a target slip amount. Therefore, the torque fluctuation of the output shaft due to fluctuation of the slip amount may be able to be effectively restrained.

However, according to a vehicle disposing a torque converter with a lock-up clutch between a vehicle driving power source such as an engine and the automatic transmission, load applied to the driving power source from the automatic transmission, i.e. an inertia of the input shaft of the transmission widely varies in accordance with an engagement condition of the lock-up clutch. For example, when gain of the controller and phase characteristics thereof are adapted for preventing the output shaft torque from fluctuating along with the clutch-to-clutch shift operation during the lock-up clutch being engaged, the gain of the controller may become excessive along with the clutch-to-clutch shift operation during the lock-up clutch being disengaged. The output torque may be unnecessarily generated with large pulsation. Therefore, the shift feeling may become worse.

Accordingly, the present invention therefore seeks to provide an improved control apparatus for controlling the shift operation in the automatic transmission, which can ensure a favorable shift feeling along with the clutch-to-clutch shift operation independently of the engaged/disengaged condition of the lock-up clutch.

SUMMARY OF THE INVENTION

According to an aspect of the present invention, a control apparatus for controlling a shift operation in an automatic transmission performing a predetermined shift stage by maintaining respective plural friction engagement elements to be engaged or disengaged includes a fluid type transmitting mechanism (21) for transmitting an output from a vehicle driving power source to the automatic transmission, a lock-up clutch (22) disposed in parallel to the fluid type transmitting mechanism and adapted to be engaged or not to be engaged and adapted for transmitting the output from the driving power source to the automatic transmission during the lock-up clutch at least being engaged, a lock-up clutch controlling means (50) for controlling the lock-up clutch to be engaged or not to be engaged in accordance with a vehicle driving condition, and a clutch-to-clutch shift operation controlling means (50) for generating a slip by reducing torque transmitted via an off-going friction engagement element and performing a shift operation by increasing torque transmitted via an on-coming friction engagement element. The off-going friction engagement element of the plural friction engagement elements is switched from the engaged condition to the disengaged condition along with the shift operation from a shift stage to the other shift stage. The on-coming friction engagement element of the plural friction engagement elements is switched from the disengaged condition to the engaged condition along with the shift operation from the shift stage to the other shift stage;

The clutch-to-clutch shift operation controlling means includes an input shaft rotation speed obtaining means (step 1520) for obtaining a value corresponding to a rotation speed of an input shaft of the automatic transmission, an output shaft rotation speed obtaining means (step 1510) for obtaining a value corresponding to a rotation speed of an output shaft of the automatic transmission, and a slip amount controlling means (step 1650 and 1700) having a feedback controller for controlling the torque transmitted via the off-going friction engagement element for matching a control slip amount obtained based upon the values corresponding to the input shaft rotation speed and the output shaft rotation speed with a predetermined target slip amount and switching a gain of the feedback controller and phase characteristics thereof in response to the engagement condition of the lock-up clutch.

The value corresponding to the input shaft rotation speed includes the input shaft rotation speed or a value obtained by applying a low-pass filtering process to the input shaft rotation speed. The low-pass filtering process removes a frequency of the input shaft rotation speed being substantially equal to or greater than a predetermined frequency for removing high frequency noise such as sensor noise included in the input shaft rotation speed. The value corresponding to the output shaft rotation speed includes the output shaft rotation speed or a value obtained by applying a low-pass filtering process to the output shaft rotation speed. The lo-pass filtering process removes a frequency of the output shaft rotation speed being substantially equal to or greater than a predetermined frequency for removing high frequency noise such as sensor noise included in the output shaft rotation speed. The low-pass filtering process removes fluctuation of the output shaft rotation speed due to the fluctuation of the intolerance of the driving circuit.

The feedback controller controls the torque transmitted via the off-going friction engagement element for matching the control slip amount obtained based upon the values corresponding to the input shaft rotation speed and the output shaft rotation speed with the target slip amount. In this case, the gain of the feedback controller and the phase characteristics thereof are switched corresponding to the engagement condition of the lock-up clutch. The slip amount can be hence effectively controlled by the feedback controller having preferable characteristics corresponding to inertia of an input shaft of the automatic transmission which is changed in response to the engagement condition of the lock-up clutch, wherein the slip amount won't fluctuate. Therefore, the clutch-to-clutch shift operation can be performed with a good shift feeling with only slight fluctuation of an output shaft of the transmission.

According to another aspect of the present invention, the slip amount controlling means further includes a notch filtering means (1525) for obtaining a notch filtered input shaft rotation speed by applying a notch filtering process for removing frequency component in a predetermined frequency domain to the value corresponding to the input shaft rotation speed obtained by the input shaft rotation speed obtaining means. In this case, the slip amount controlling means substantially switches the gain of the feedback controller and the phase characteristics thereof by obtaining the control slip amount based upon the value corresponding to the input shaft rotation speed prior to be applied with the notch filtering process and the value corresponding to the output shaft rotation speed during the lock-up clutch being engaged and based upon the notch filtered input shaft rotation speed and the value corresponding to the output shaft rotation speed obtained by the output shaft rotation speed obtaining means while the lock-up clutch has not been engaged.

Therefore, the control slip amount won't be fluctuant and the actual slip amount can be effectively controlled not to fluctuate, wherein a good shift feeling can be obtained upon the clutch-to-clutch shift operation. Further, the clutch-to-clutch shift operation can be properly performed while the lock-up clutch has not been engaged only by adapting the feedback controller for performing the clutch-to-clutch shift operation during the lock-up clutch being engaged. In other words, the feedback controller is not required to be additionally adapted for performing the clutch-to-clutch shift operation while the lock-up clutch has not been engaged. Therefore, load and energy can be effectively saved and manufacturing cost can be reduced.

BRIEF DESCRIPTION OF THE DRAWING FIGURES

The foregoing and additional features and characteristics of the present invention will become more apparent from the following detailed description considered with reference to the accompanying drawing figures wherein.

Figure 1:
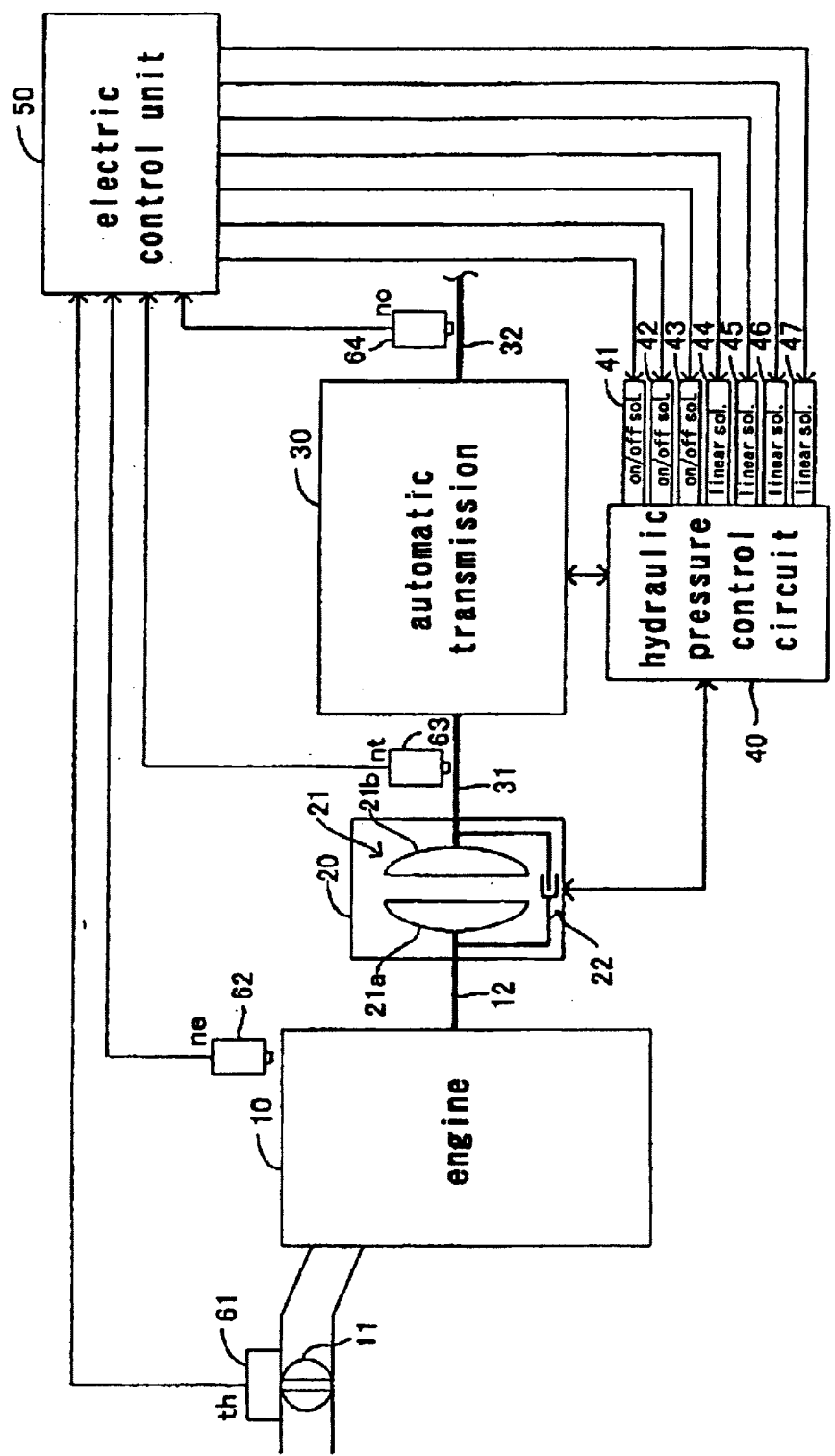
FIG. 1 is a schematic view illustrating a vehicle mounting a control apparatus for controlling a shift operation of an automatic transmission according to an embodiment of the present invention.
Figure 3:
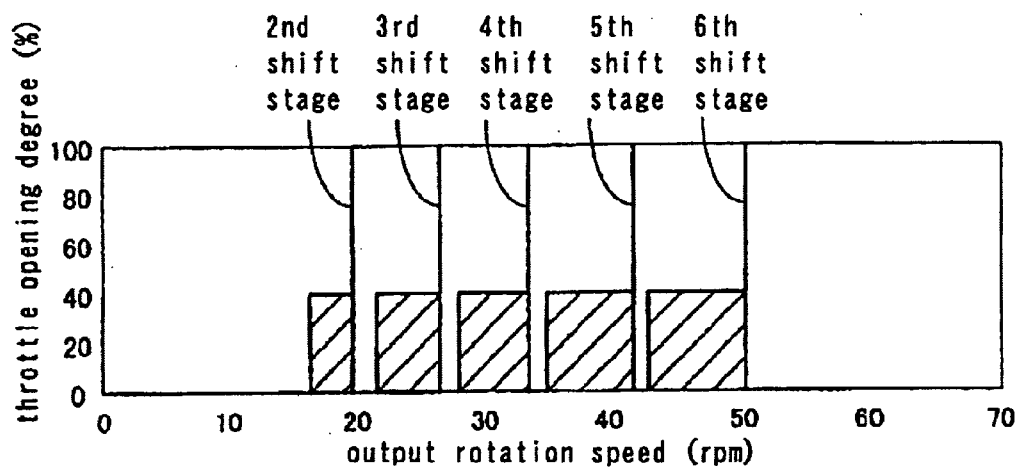
Figure 3:
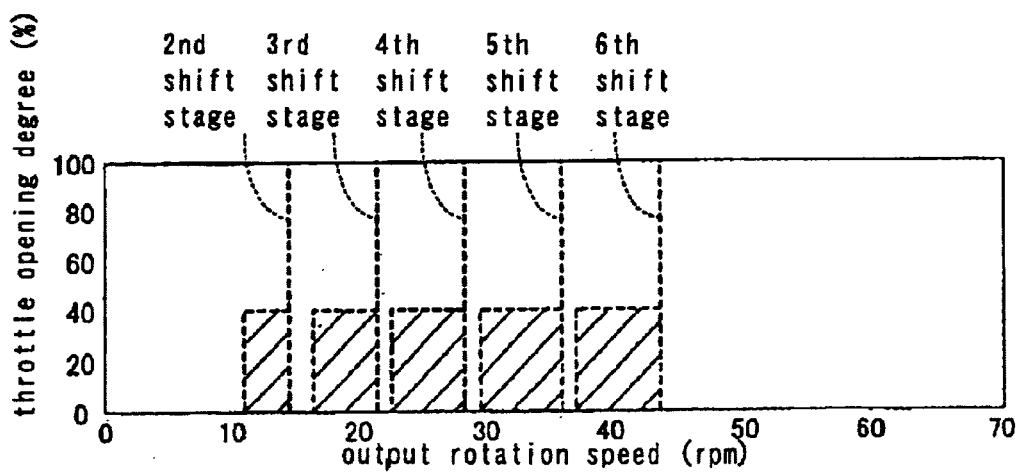
Figure 4:
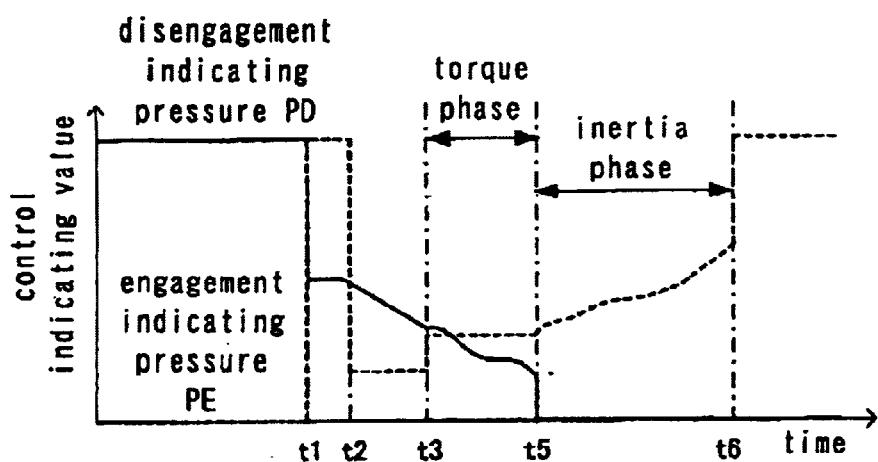
Figure 4:
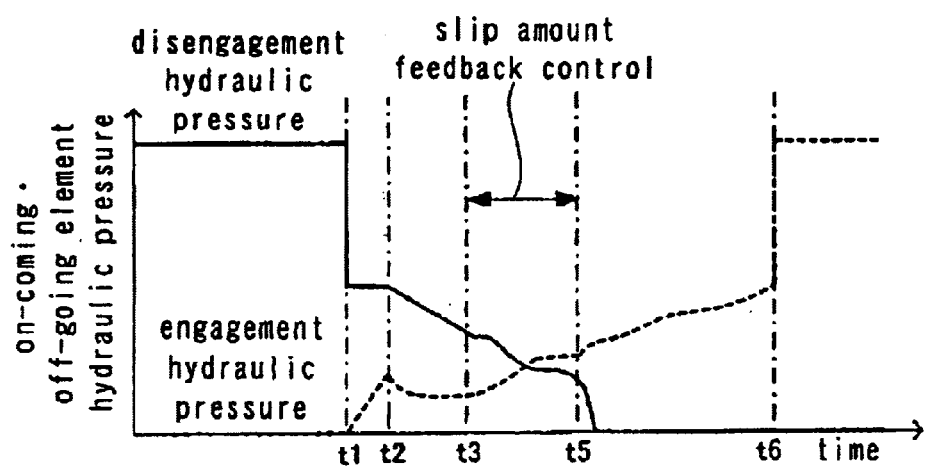
Figure 4:
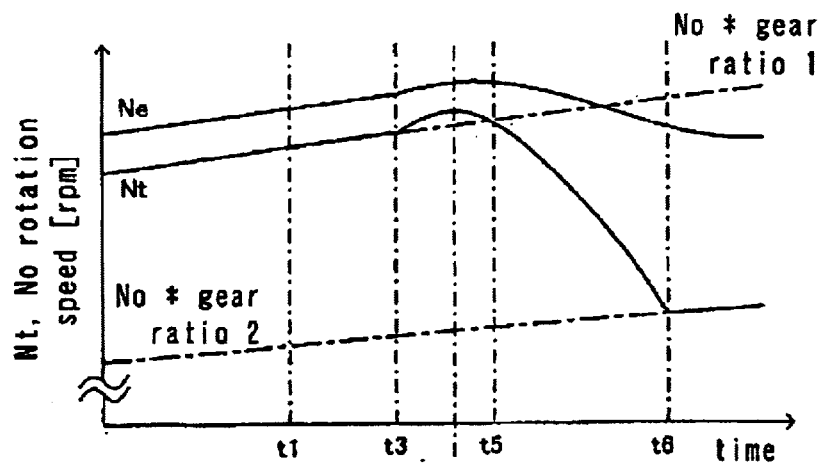
Figure 4:
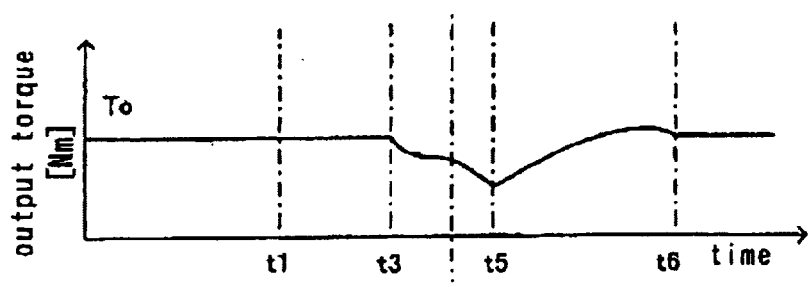
Figure 4:
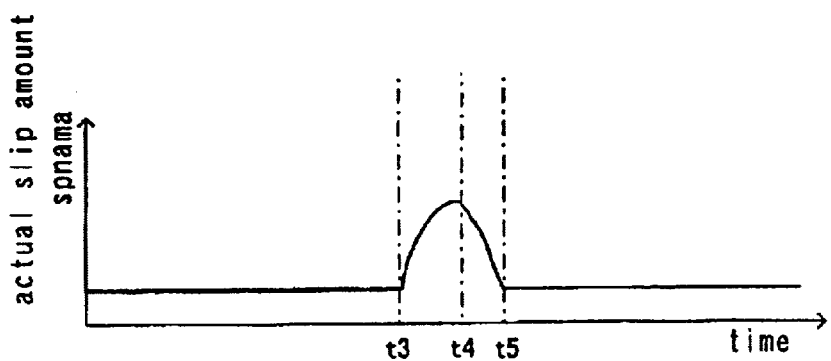
Figure 5:
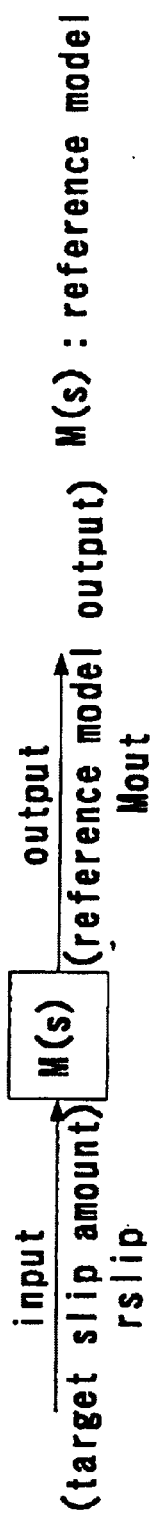
Figure 6:
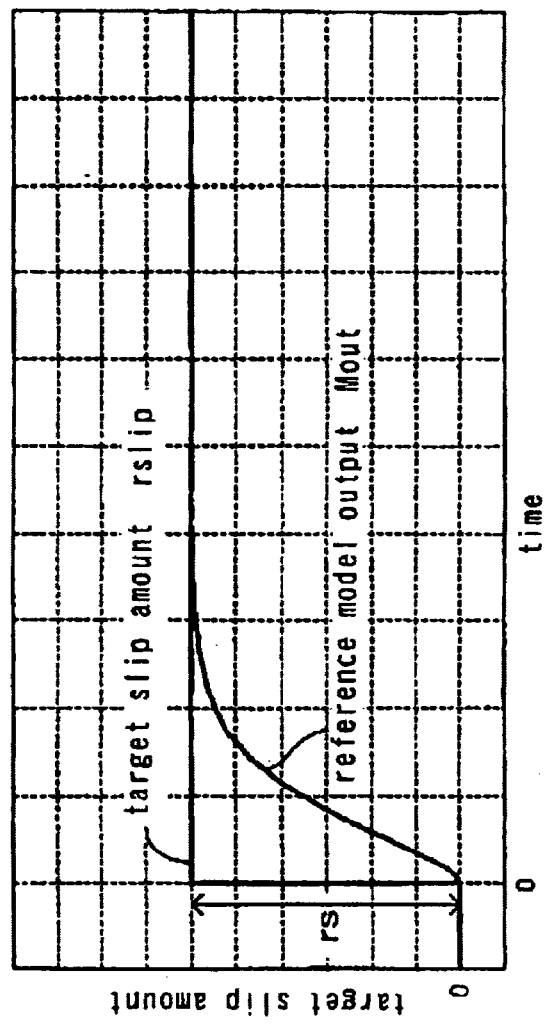
Figure 7:
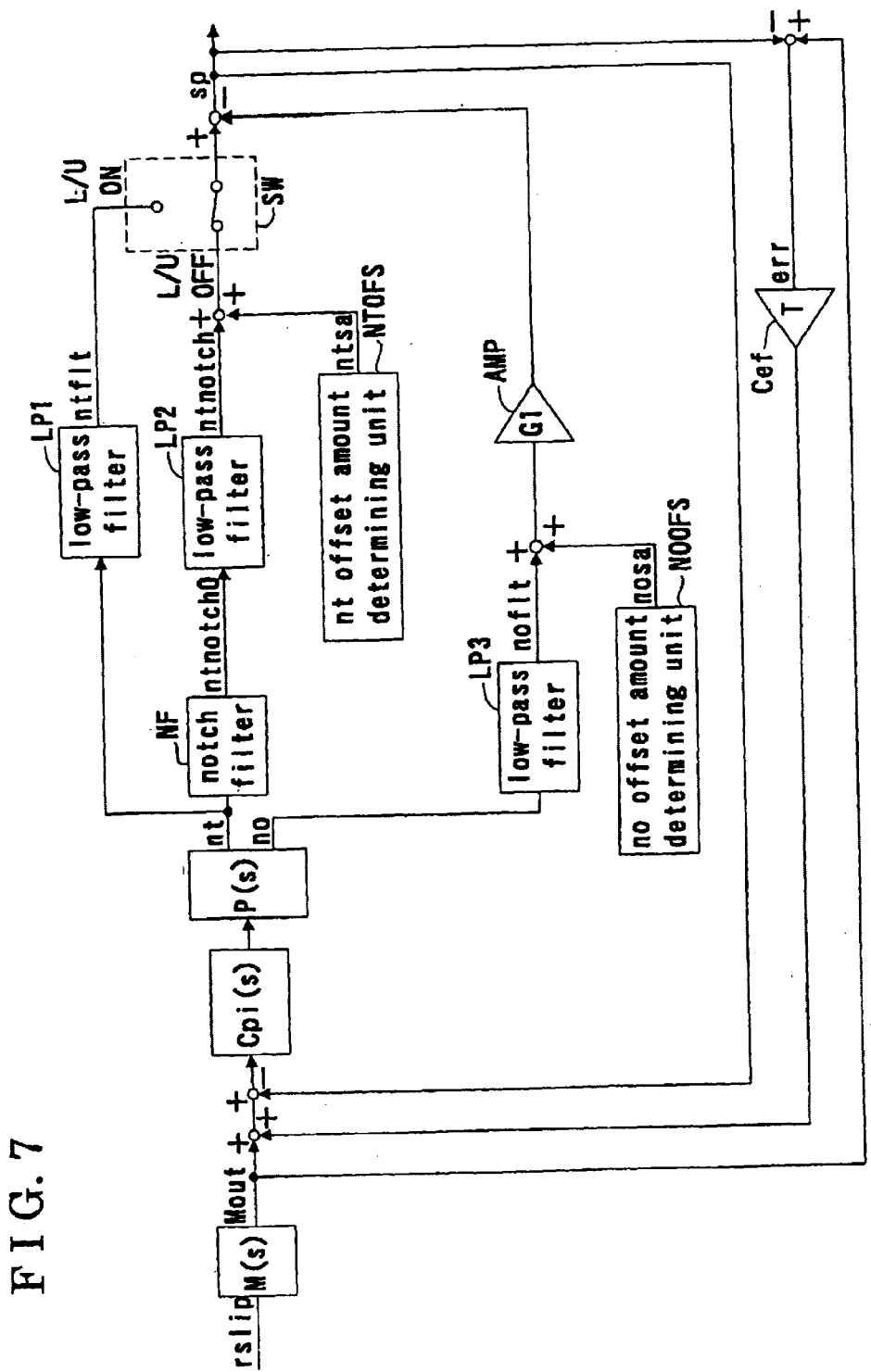
Figure 8:
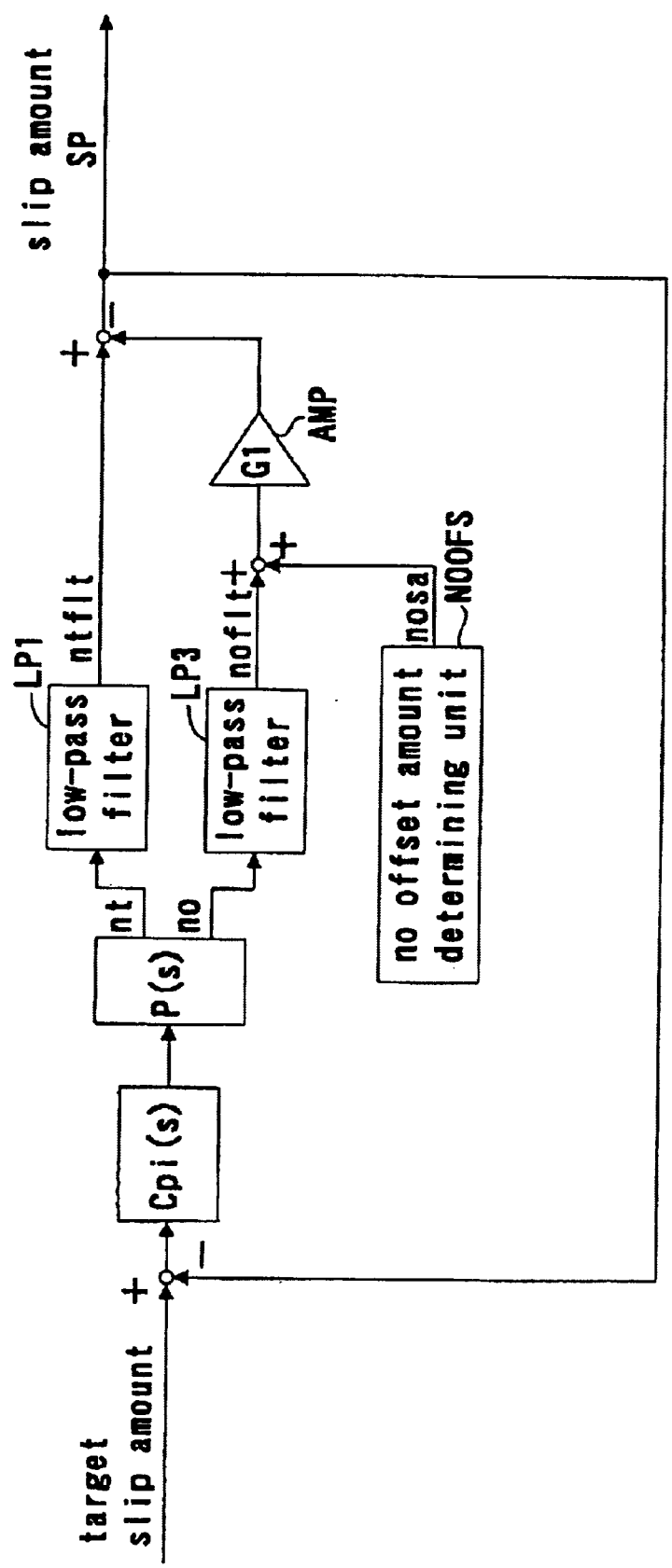
Figure 9:
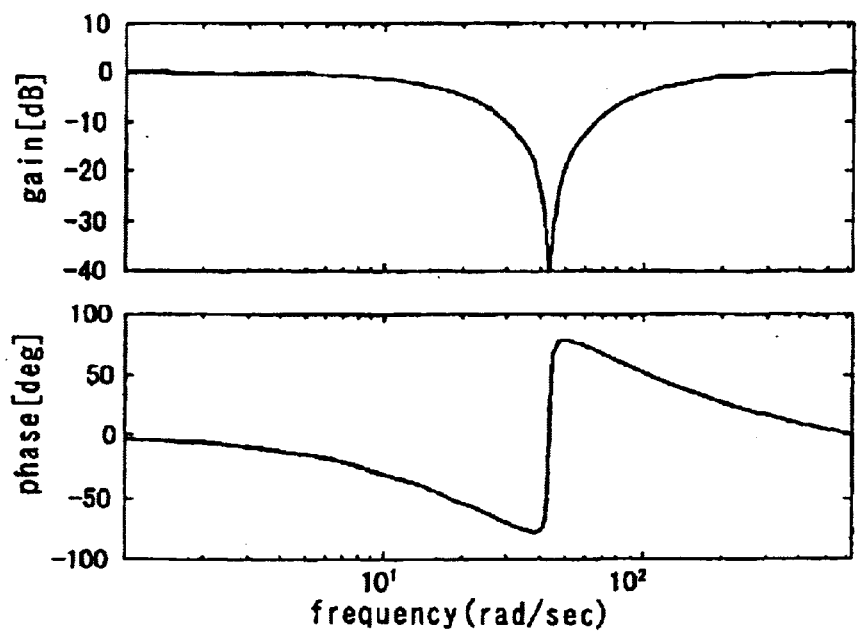
Figure 10:
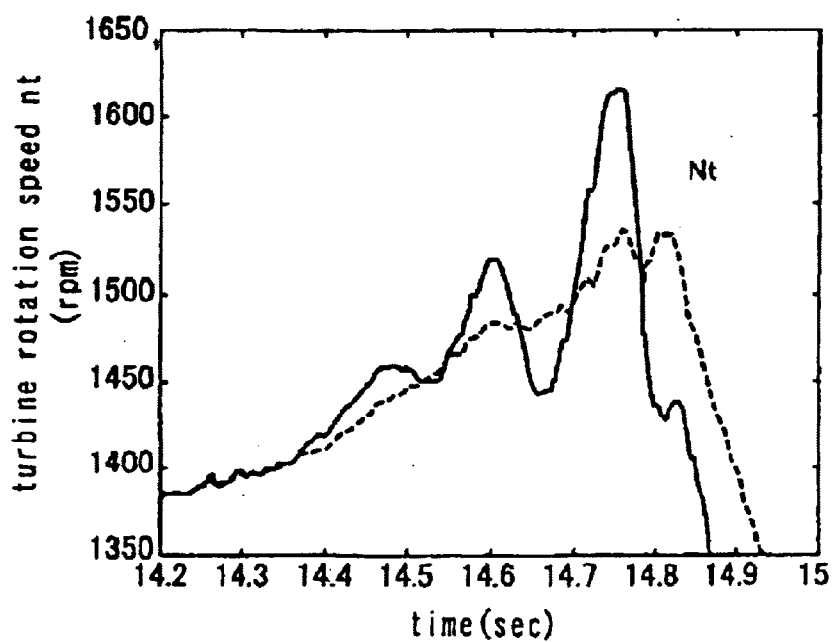
Figure 11A:
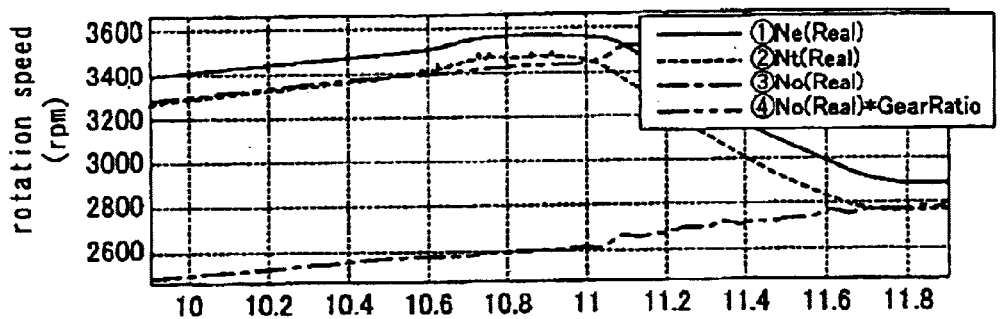
Figure 11B:
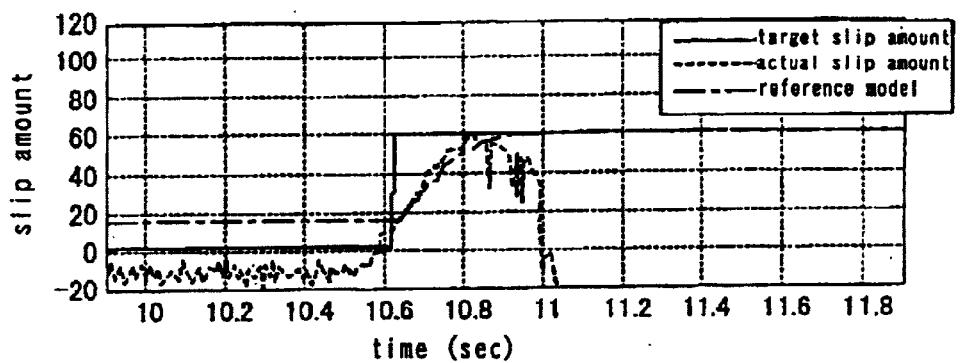
Figure 12:
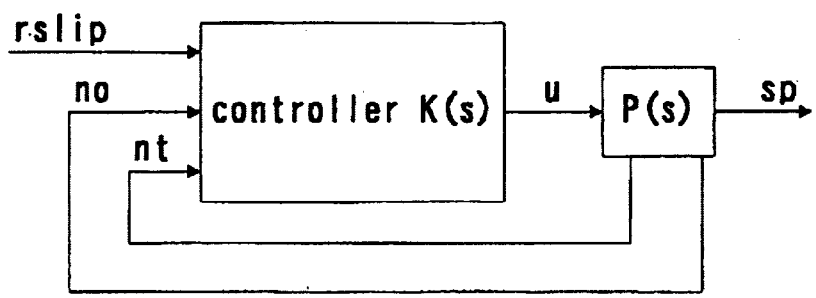
Figure 13:
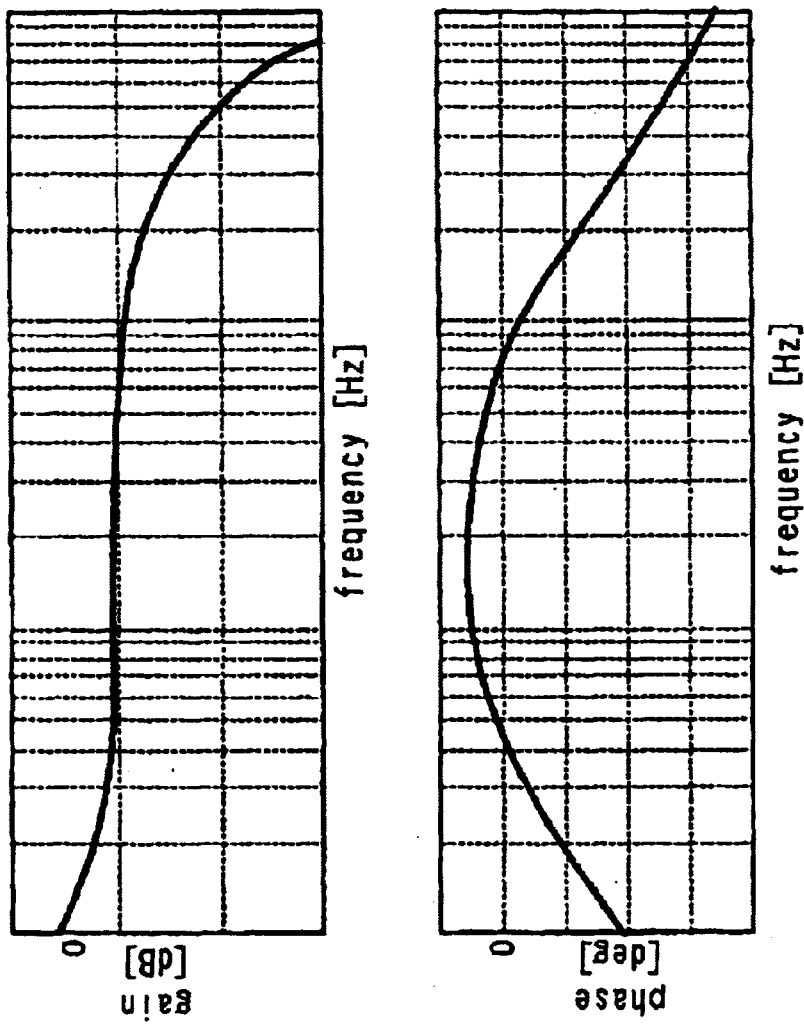
Figure 14:
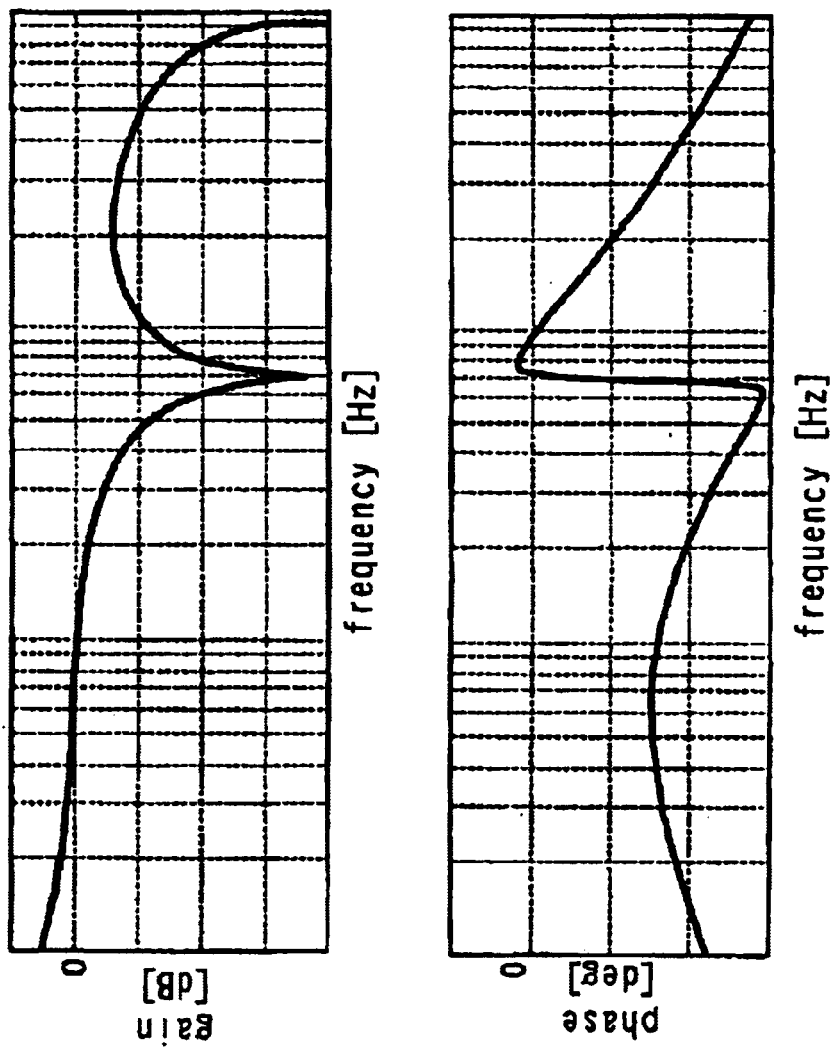
Figure 15:
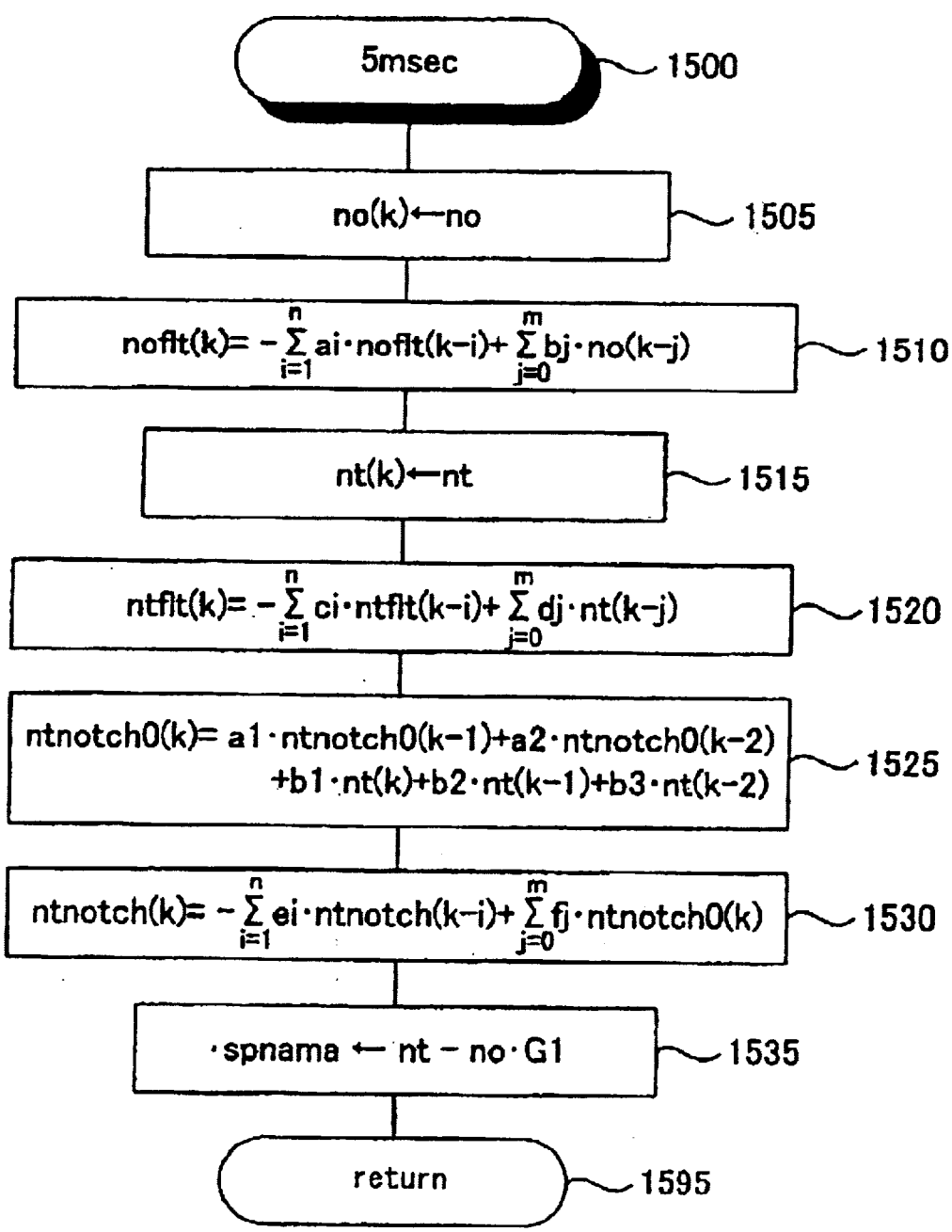
Figure 16:
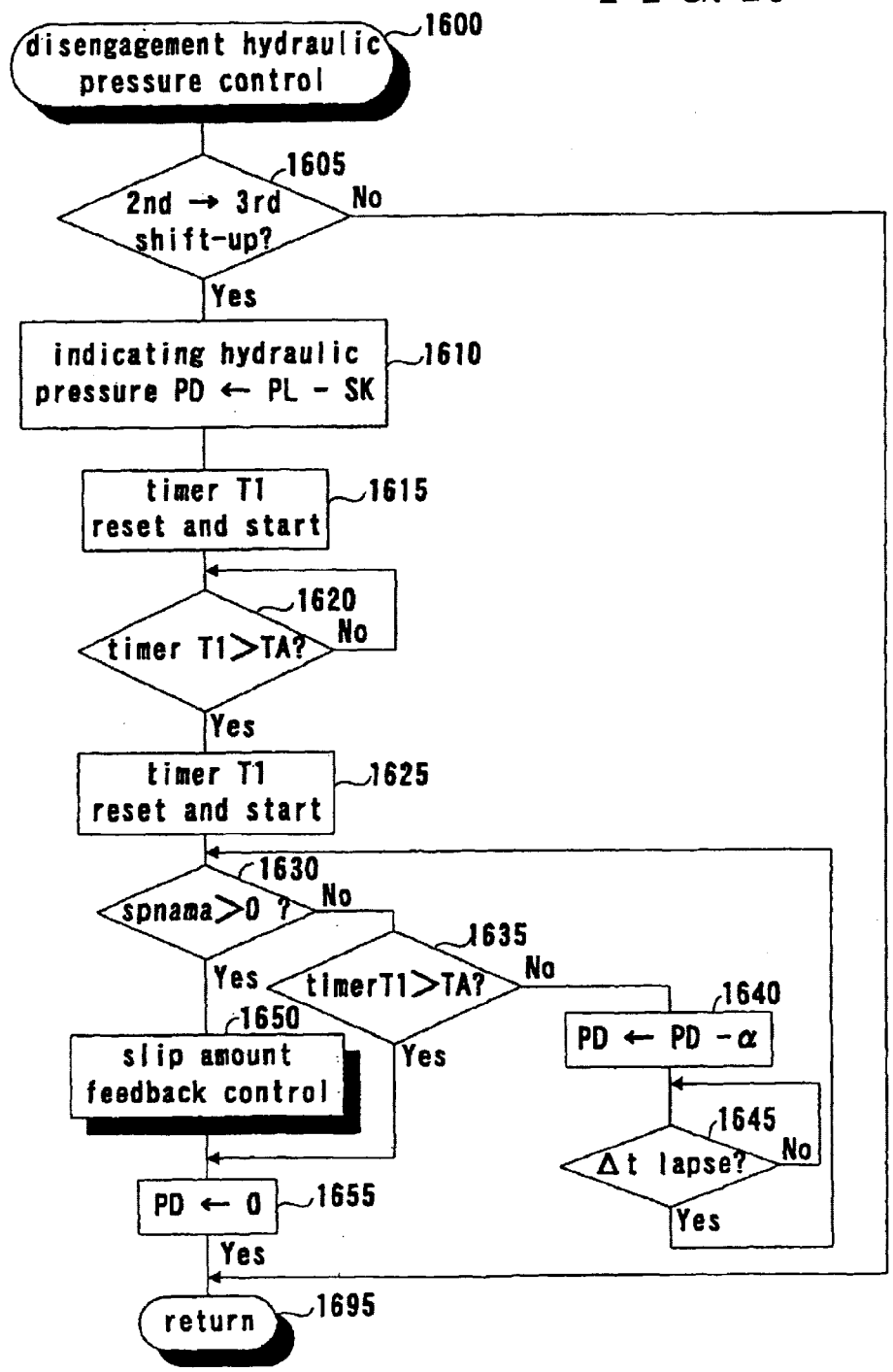
Figure 17:
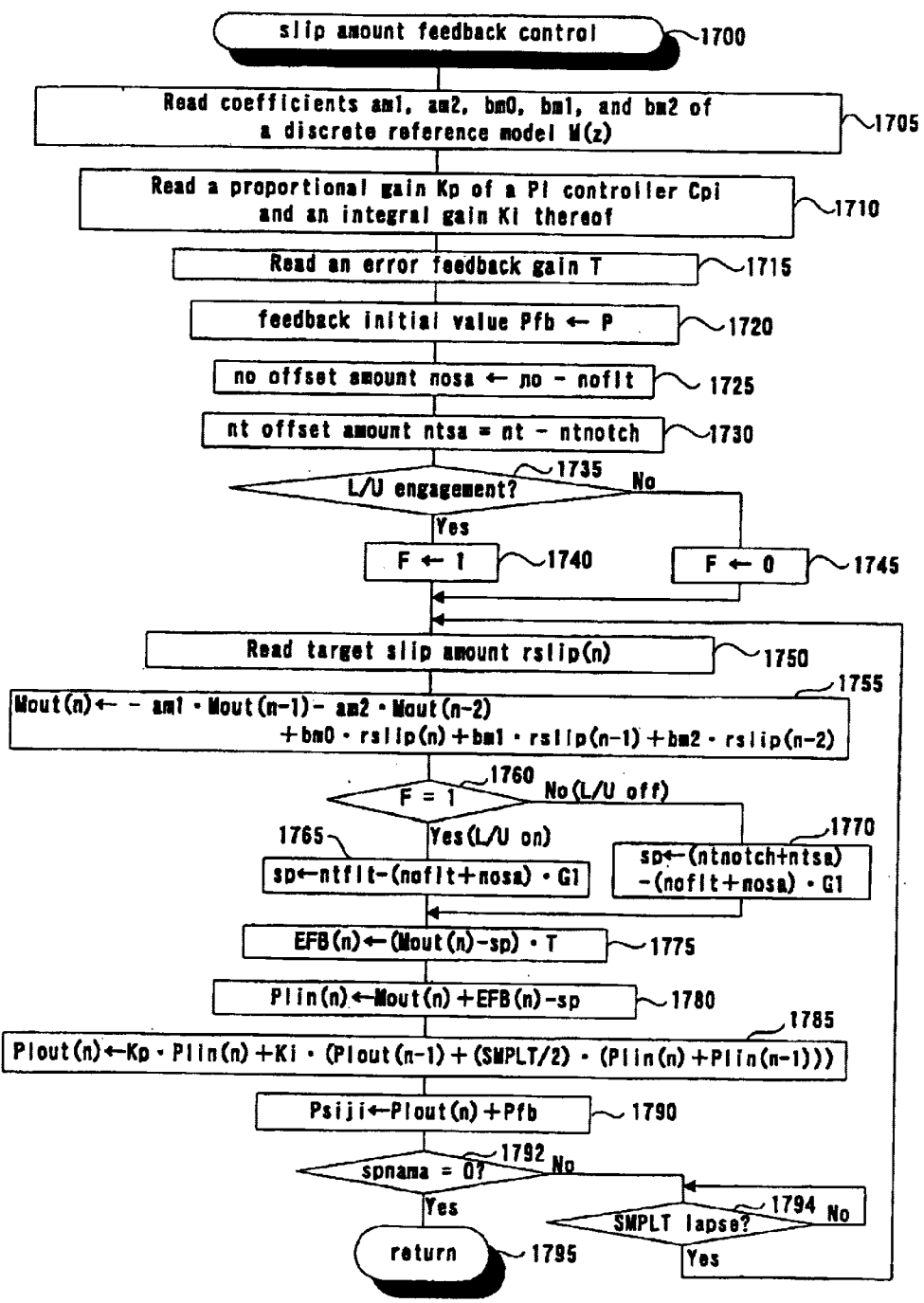
Figure 18:
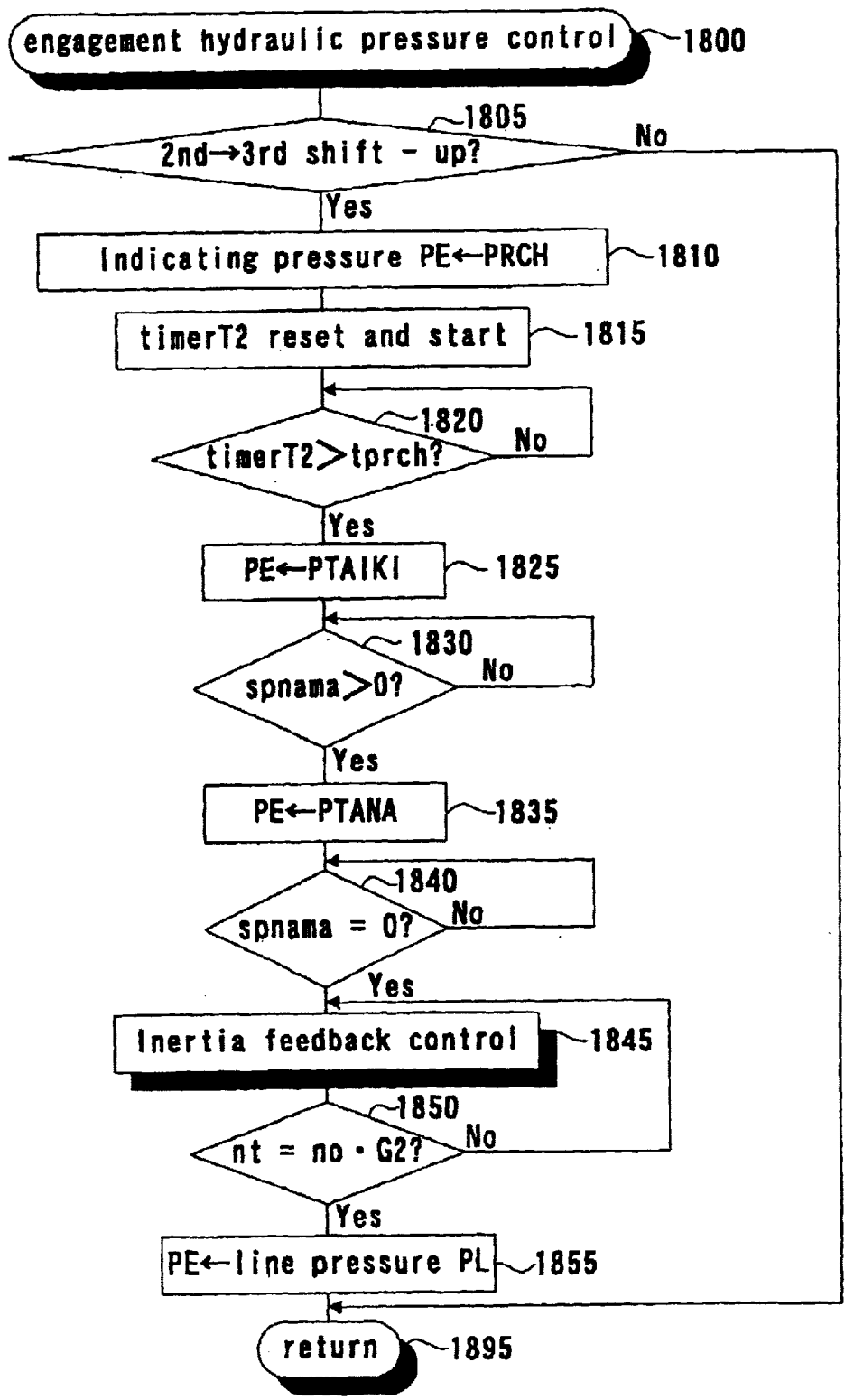

FIGS. 3(A) and 3(B) respectively illustrate a lock-up clutch operation map when a vehicle is accelerated and decelerated;

FIG. 4(A) is a time chart illustrating a disengagement indicating pressure and an engagement indicating pressure upon a shift-up operation from a second shift stage to a third shift stage performed by the control apparatus illustrated in FIG. 1, FIG. 4(B) is a time chart illustrating an actual disengagement hydraulic pressure and an actual engagement hydraulic pressure upon the shift-up operation, FIG. 4(C) is a time chart illustrating an engine rotation speed and an input shaft rotation speed upon the shift-up operation, FIG. 4(D) is a time chart illustrating torque of an output shaft of the transmission upon the shift-up operation, and FIG. 4(E) is a time chart illustrating an actual slip amount upon the shift-up operation;

FIG. 5 is a block diagram of a reference model employed by the control apparatus illustrated in FIG. 1;

FIG. 6 is a time chart illustrating a target slip amount inputted into the reference model illustrated in FIG. 5 and an output from the reference model relative to the input;

FIG. 7 is a block diagram illustrating the control apparatus for controlling the shift operation in the automatic transmission illustrated in FIG. 1 according to the embodiment of the present invention;

FIG. 8 is a block diagram illustrating a closed loop employed for determining a feedback controller illustrated in FIG. 7;

FIG. 9 is a bode diagram of a notch filter illustrated in FIG. 7;

FIG. 10 is a time chart illustrating an input shaft rotation speed along with the clutch-to-clutch shift operation when a lock-up clutch has not been engaged, wherein a solid line illustrates an input shaft rotation speed according to a conventional control apparatus for controlling the shift operation and a broken line illustrates the input shaft rotation speed according to the control apparatus illustrated in FIG. 1;

FIGS. 11(A) and 11(B) illustrates changes of several rotation speeds and changes of a slip amount along with the clutch-to-clutch shift operation during the lock-up clutch being disengaged;

FIG. 12 is a block view for explaining a control system illustrated in FIG. 7;

FIG. 13 is a bode diagram of a controller illustrated in FIG. 7 during the lock-up clutch being engaged;

FIG. 14 is a bode diagram of the controller illustrated in FIG. 7 while the lock-up clutch has not been engaged;

FIG. 15 shows a flow chart for explaining a program (5 msec routine) executed by a CPU of an electric control unit illustrated in FIG. 1;

FIG. 16 shows a flow chart for explaining a program (a disengagement hydraulic pressure control routine) executed by the CPU according to the embodiment of the present invention;

FIG. 17 shows a flow chart for explaining a program (a slip amount feedback control routine) executed by the CPU according to the embodiment of the present invention; and FIG. 18 shows a flow chart for explaining a program (an engagement hydraulic pressure control routine) executed by the CPU according to the embodiment of the present invention.

DETAILED DESCRIPTION OF THE INVENTION

Referring to FIG. 1, a vehicle according to an embodiment of the present invention is provided with an engine 10 as a vehicle driving power source, a fluid type torque converter with a lock-up clutch 20, an automatic transmission 30, a hydraulic pressure control circuit 40 for controlling pressure of oil supplied to the torque converter 20 and the automatic transmission 30, and an electric control unit 50 sending control indicating signals to the hydraulic pressure control circuit 40. Driving torque of the engine 10 increased/decreased in response to operation of an accelerator pedal (not shown) is transmitted to a drive wheel via the torque converter 20, the automatic transmission 30, and a differential gear (not shown).

Figure 2:
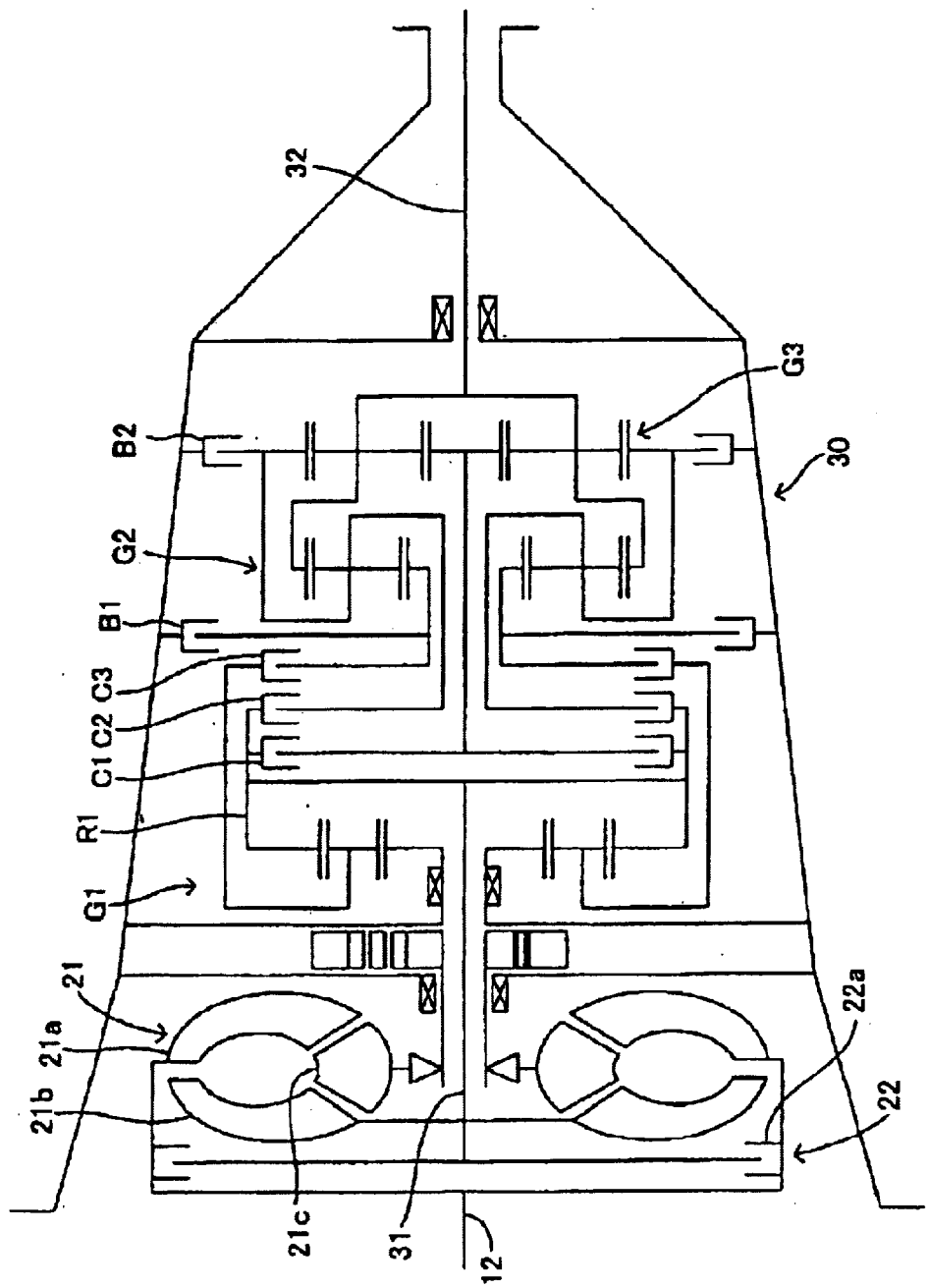
FIG. 2 is a schematic view illustrating detailed inner structure of the automatic transmission illustrated in FIG. 1.

As seen especially in FIGS. 1 and 2, the torque converter with the lock-up clutch 20 includes a fluid type transmitting mechanism 21 capable of transmitting the torque from the engine 10 to the automatic transmission 30 via fluid (operation fluid) and a lock-up clutch mechanism 22 connected to the fluid type transmitting mechanism 21 in parallel. The fluid type transmitting mechanism 21 is assembled with a pump impeller 21a connected to a torque converter input shaft 12 integrally rotated with a crank shaft (not shown) of the engine 10, a turbine wheel 21b connected to an input shaft 31 of the transmission 30 and rotated along with flow of the operation fluid generated by the pump impeller 21a, and a stator 21c.

The lock-up clutch mechanism 22 includes a lock-up clutch 22a. The lock-up clutch mechanism 22 can establish three conditions in response to the operation oil supplied to the lock-up clutch mechanism 22 or discharged therefrom by the hydraulic pressure control circuit 40 connected to the lock-up clutch mechanism 22; the first condition is an engaged condition in which the input shaft 12 of the torque converter 20 and the input shaft 31 of the transmission 30 are mechanically connected each other via the lock-up clutch 22a and are further rotated as a single unit, the second condition is a disengaged condition in which the input shafts 12 and 31 are released from being engaged via the lock-up clutch 22a; and the third condition is a slipped condition being an intermediate condition between the engaged and disengaged conditions, in which the lock-up clutch 22a is slipped.

The automatic transmission 30 performs a single reverse shift stage and six forward shift stages. As illustrated in FIG. 2, the transmission 30 is provided with a first planetary gear G1 with a single pinion gear and a ring gear R1, a second planetary gear G2 with a single pinion gear, a third planetary gear G3 with a single pinion gear, and plural friction engagement elements including friction clutches C1, C2, C3, and friction brakes B1, B2. Table 1 shows a relationship between engaged/disengaged conditions of the respective friction engagement elements and shift stages performed with the engaged/disengaged friction engagement elements. The symbol ○ in the table 1 indicates that each corresponding friction engagement element is at the engaged condition to perform each shift stage and the absence of the symbol ○ therein indicates that each friction engagement element is at the disengaged condition.

TABLE 1

|  | C1 | C2 | C3 | B1 | B2 |
|---|---|---|---|---|---|
| 1st shift stage | ○ |  |  |  | ○ |
| 2nd shift stage | ○ |  |  | ○ |  |
| 3rd shift stage | ○ |  | ○ |  |  |
| 4th shift stage | ○ | ○ |  |  |  |
| 5th shift stage |  | ○ | ○ |  |  |
| 6th shift stage |  | ○ |  | ○ |  |
| Reverse shift stage |  |  | ○ |  | ○ |

As seen in FIG. 1, the hydraulic pressure control circuit 40 is provide with three on/off solenoid valves 41, 42, 43 and four linear solenoid valves 44, 45, 46, 47 which all are controlled by the corresponding control indicating signals from the electric control unit 50. The hydraulic pressure control circuit 40 controls the amount of the operation oil supplied to the friction engagement elements of the transmission 30 or discharged therefrom based upon combinations of the electrically excited on/off solenoid valves 41, 42, and 43. The hydraulic pressure control circuit 40 further controls the hydraulic pressure of the operation oil supplied to the friction engagement elements or discharged therefrom to be approximately a line pressure level or lower than that by electrically exciting the linear solenoid valves 44, 45, and 46. The hydraulic pressure control circuit 40 still further controls the hydraulic pressure of the operation oil supplied to the lock-up clutch mechanism 22 or discharged therefrom to be approximately equal to the line pressure level or lower than that by electrically exciting the linear solenoid valve 47.

The electric control unit 50 forms a microcomputer having a CPU, memories (ROM, RAM), and interfaces which all are not illustrated. The electric control unit 50 is connected to a throttle opening degree sensor 61, an engine rotation speed sensor 62, an input shaft (turbine wheel) rotation speed sensor 63, and an output shaft rotation speed sensor 64. Signals respectively outputted from the sensors are inputted to the electric control unit 50.

The throttle opening degree sensor 61 detects an opening degree of a throttle valve 11 disposed in an inlet passage of the engine 10 and opened/closed in response to the operation of the accelerator pedal (not shown) and outputs a signal representing a throttle opening degree th of the throttle valve 11. The engine rotation speed sensor 62 (an engine rotation speed detecting means) detects a rotation speed (hereinafter, referred to as an RPM) of the engine 10 and outputs a signal representing an engine RPM ne. The input shaft rotation speed sensor 63 (an input shaft (an turbine wheel) rotation speed detecting means) detects an RPM of the input shaft 31 of the transmission 30 and outputs a signal representing an input shaft RPM (i.e. a turbine wheel RPM) nt. The output shaft rotation speed sensor 64 (an output shaft rotation speed detecting means) detects an RPM of an output shaft 32 of the transmission 30 and outputs a signal representing an output shaft RPM no. The output shaft RPM no proportionally corresponds to a vehicle speed.

The electric control unit 50 stores a shift map based upon the output shaft RPM no and the throttle opening degree th and a lock-up clutch operation map. The on/off solenoid valves 41, 42, 43 and linear solenoid valves 44, 45, 46 are controlled by the electric control unit 50 when an operational status point defined by the detected output shaft RPM no and the detected throttle opening degree th crosses a shift line illustrated in the shift map. Accordingly, the engaged/disengaged condition of each friction engagement element is switched as being explained in the table 1. The linear solenoid valve 47 is controlled by the electric control unit 50 (a lock-up clutch controlling means) when the operational status point crosses a lock-up clutch operating line in the lock-up clutch operation map illustrated in FIGS. 3(A) and 3(B). Accordingly, the engaged/disengaged condition of the lock-up clutch 22a is switched.

More specifically, FIGS. 3(A) and 3(B) show each lock-up clutch operating line for each shift stage during the lock-up clutch 22a being disengaged and being engaged, respectively. Taking an example therefrom, when the second shift stage has been performed in the transmission 30 during the lock-up clutch 22a being disengaged, the lock-up clutch 22a is switched to the engaged condition in response to the crossing of the operational status point over a lock-up clutch operating line illustrated at the left-hand side of FIG. 3(A) in a right direction. When the operational status point enters into a shaded area after crossing the lock-up clutch operating line, the lock-up clutch 22a is switched from the disengaged condition to the slipped condition. On the other hand, a lock-up clutch operating line illustrated in FIG. 3(B) is selected after the lock-up clutch 22a was switched to the engaged condition. Taking an example therefrom, when the second shift stage has been performed in the transmission 30 during the lock-up clutch 22a being engaged, the lock-up clutch 22a is switched from the engaged condition to the disengaged condition in response to the crossing of the operational status point over a lock-up clutch operating line denoted by a broken line at the left-hand side in FIG. 3(B) in a left direction.

Next, a clutch-to-clutch shift operation is described hereinbelow. The clutch-to-clutch shift operation is controlled by a control apparatus for controlling the shift operation in the transmission 30. The clutch-to-clutch shift operation according to the embodiment of the present invention is applicable when the shift stage is shifted from the second shift stage to the third shift stage.

With reference to FIGS. 4(A) through 4(E), the hydraulic pressure control upon the shift-up operation from the second shift stage to the third shift stage is described below. A solid line illustrated in FIG. 4(A) represents an indicating hydraulic pressure (hereinafter, referred to as a disengagement indicating pressure) applied to an off-going friction engagement element, which is adapted to be disengaged at the time of the shift-up operation, and a broken line therein represents an indicating hydraulic pressure (hereinafter, referred to as an engagement indicating pressure) applied to an on-coming friction engagement element, which is adapted to be engaged at the time of the shift-up operation. According to the embodiment of the present invention, the off-going friction engagement element is the brake B1 and the on-coming friction engagement element is the clutch C3. A solid line illustrated in FIG. 4(B) represents an actual hydraulic pressure (hereinafter, referred to as a disengagement hydraulic pressure) actually applied to the off-going friction engagement element and a broken line therein represents an actual hydraulic pressure (hereinafter, referred to as an engagement hydraulic pressure) actually applied to the on-coming friction engagement element.

The electric control unit 50 performs an initial ramp releasing control for rapidly decreasing the disengagement hydraulic pressure from a level of the line pressure PL in response to the crossing of the operational status point over the shift-up line from the second shift stage to the third shift stage at a time t1. Accordingly, the off-going friction engagement element starts slipping at a time t3. The electric control unit 50 then performs a slip amount feedback control which is described later. Therefore, as illustrated in FIG. 4(E), the slip amount is smoothly increased from the time t3 to a time t4.

Meanwhile, the electric control unit 50 performs a pre-charge control for rapidly increasing the engagement hydraulic pressure for a predetermined period of time from the time t1 to a time t2. The electric control unit 50 then performs an engagement hydraulic pressure maintaining control at the time t2, in which the engagement hydraulic pressure is maintained at a constant pressure value until the off-going friction engagement element starts slipping at the time t3. The electric control unit 50 then performs another pressure maintaining control for maintaining the engagement hydraulic pressure at a predetermined pressure level being greater than the constant pressure value in response to the initial slip of the off-going friction engagement element at the time t3. The torque then can be transmitted via the on-coming friction engagement element so that reduction of the slip amount is initiated. In this case, the electric control unit 50 tries to maintain the slip amount at a target value by performing the slip amount feedback control so that the disengagement hydraulic pressure is reduced so as to increase the slip amount.

The electric control unit 50 then reduces the disengagement hydraulic pressure down to zero value instantly in response to the vanishing of the slip amount at a time t5. The electric control unit 50 further performs an inertia feedback control for controlling the engagement hydraulic pressure to match a change rate of the input shaft RPM nt $\Delta$nt with a target RPM change rate $\Delta$MNT. The engagement hydraulic pressure is then increased up to the line pressure PL when the input shaft RPM nt corresponds to a value calculated by multiplying the output shaft RPM no by a gear ratio of the up-shifted shift stage (i.e. the third shift stage according to the embodiment of the present invention). As illustrated in FIG. 4(C), the calculated value is expressed in accordance with the following formula:

$$Nt=No*\text{gear ratio 2.}$$

As described above, the clutch-to-clutch shift operation is completed.

Next, a principle of the slip amount feedback control performed from the time t3 to the time t5 is described hereinbelow with reference to FIGS. 5 and 6. A reference model M(s) illustrated in FIGS. 5 and 6 outputs an ideal slip amount Mout when being inputted with a target slip amount rslip increased in a stairstep manner from zero value up to a predetermined value rs. The ideal slip amount Mout is gradually and consecutively increased as time goes on and reaches the predetermined value rs in a time determined by a value tr. Therefore, the ideal slip amount Mout is effective not to cause a shift shock. A transfer function of the reference model M(s) is determined in accordance with a binominal model. More specifically, the reference model M(s) is expressed in accordance with the following formula 1:

$$M(s)=1/(tr \cdot s+1)^2$$

(hereinafter, "s" represents a differential operator).

Next, a controlled object P(s) is described below. The controlled object P(s) is inputted with the disengagement hydraulic pressure (i.e. a hydraulic pressure for engaging the brake B1) and outputs an actual slip amount spnama. The controlled object P(s) is a transfer function of the automatic transmission 30 determined by way of a systematic identification. As illustrated in FIG. 7, a closed loop for executing the feedback control is formed by the reference model M(s), a feedback controller Cpi(s), the controlled object P(s), a first low-pass filter LP1, a notch filter NF, a second low-pass filter LP2, an nt offset amount determining unit NTOFS, a third low-pass filter LP3, an no offset amount determining unit NOOFS, a gear ratio amplifier AMP, a switching unit SW, and an error feedback controller Cef.

The feedback controller Cpi(s) is a proportional-plus-integral controller (PI controller) and a target input value thereof is the ideal slip amount Mout outputted from the reference model M(s). Therefore, the reference model M(s) serves as a target slip amount generating means. The feedback controller Cpi(s) is expressed in accordance with the following formula 2:

$$Cpi(s)=Kp+Ki/s.$$

A proportional gain (a proportional sensibility) Kp and an integral gain (an integral sensibility) Ki according to the above-described formula 2 are obtained by the following test. As illustrated in FIG. 8, a feedback circuit is employed relative to the controlled object P(s). The feedback circuit is established by omitting the notch filter NF, the second low-pass filter LP2, the nt offset amount determining unit NTOFS, the switching unit SW, and the error feedback controller Cef from the closed loop illustrated in FIG. 7. Therefore, a feedback control amount spluon inputted to the feedback controller Cpi(s) is expressed in accordance with the following formula 3:

$$spluon=ntflt-(noflt+nosa) \cdot G1.$$

The value ntflt represents an input shaft RPM nt filtered via the low-pass filter LP1 for removing a frequency component being substantially equal to or greater than a first frequency (eg. 20 Hz) of the input shaft RPM nt which is one of the outputs from the controlled object P(s). The value noflt represents an output shaft RPM no filtered via the low-pass filter LP3 for removing a frequency component being smaller than the first frequency but being substantially equal to or greater than a third frequency (eg. 1 Hz) of the output shaft RPM no which is another one of the outputs from the controlled object P(s). The value nosa is obtained by the no offset amount determining unit NOOFS and represents a difference between the output shaft RPM no and the low-pass filtered output shaft RPM noflt which both are obtained when the actual slip amount spnama (=nt−no·G1) exceeds a predetermined value (eg. zero value) in response to the gradual decrease of the hydraulic pressure applied to the off-going friction engagement element. The value G1 represents a gear ratio of a shift stage before performing the clutch-to-clutch shift operation and is multiplied by a value (=noflt+nosa) via the gear ratio amplifier AMP. When the actual slip amount spnama exceeds the predetermined value γ during the lock-up clutch 22a being engaged, the target slip amount rslip is supplied to the feedback controller Cpi(s) so as to obtain the proportional and integral gains Kp and Ki capable of performing the feedback control without occurring fluctuation of the feedback control amount spluon and diversion thereof. As described above, the feedback controller Cpi(s) can be determined.

With reference to FIGS. 7 and 9, the notch filter NF has an extremely small gain in a frequency domain adjacent to a specific frequency and eliminates a frequency component in the frequency domain adjacent to the specific frequency which is contained in the input signal. Hereinafter, the specific frequency is referred to as a notch frequency. The notch frequency corresponds to a frequency adjacent to a central frequency of the fluctuation of the input shaft RPM nt when the clutch-to-clutch shift operation is performed with the feedback controller Cpi(s) and the slip amount spluon as the above-described feedback control amount when the lock-up clutch 22a has not been engaged, i.e. when the lock-up clutch 22a is at the disengaged condition or at the slipped condition which both are not a fully engaged condition.

The second low-pass filter LP2 removes a frequency component substantially equal to or greater than a second frequency corresponding to the first frequency. According to the embodiment of the present invention, the second low-pass filter LP2 removes the frequency component substantially equal to or greater than the second frequency contained in a notch filtered primary input shaft RPM ntnotch0 outputted from the notch filter NF and outputs a notch filtered input shaft RPM ntnotch.

The nt offset amount determining unit NTOFS determines an offset amount ntsa for compensating for a delay of the notch filtered input shaft RPM ntnotch relative to the input shaft RPM nt. The offset amount ntsa outputted from the nt offset amount determining unit NTOFS corresponds to a difference between the input shaft RPM nt and the notch filtered input shaft RPM ntnotch which both are obtained when the actual slip amount spnama exceeds the predetermined value γ (eg. zero value) after staring the decrease of the torque transmitted to the off-going friction engagement element.

The switching unit SW selects the above-described low-pass filtered input shaft RPM ntflt as a value corresponding to the input shaft RPM nt for obtaining a control slip amount sp during the lock-up clutch 22a being fully engaged. Accordingly, the control slip amount sp corresponds to the slip amount spluon expressed by the formula 3. On the other hand, the switching unit SW selects a value calculated by adding the nt offset amount ntsa into the notch filtered input shaft RPM ntnotch as the value corresponding to the input shaft RPM nt for obtaining the control slip amount sp while the lock-up clutch 22a has not been engaged. Accordingly, the control slip amount sp corresponds to a slip amount spluoff expressed by the following formula 4:

$$sp=spluoff=(ntnotch+ntsa)-(noflt+nosa) \cdot G1.$$

The error feedback controller Cef inputs an error err obtained by subtracting the control slip amount sp from the ideal slip amount Mout outputted from the reference model M(s) and outputs a value obtained by multiplying the error err by a gain T. The output from the error feedback controller Cef is superposed on the input of the feedback controller Cpi(s). The controller Cef controls the actual slip amount spnama of the automatic transmission 30 so as not to diverge the control slip amount sp in accordance with the feedback circuit illustrated in FIG. 7. As described above, the control slip amount sp can be effectively calculated corresponding to the engagement condition of the lock-up clutch 22a. The slip amount feedback control can be executed by controlling the disengagement indicating pressure applied to the off-going friction engagement element for matching the control slip amount sp with the ideal slip amount Mout outputted from the reference model M(s).

FIGS. 10 and 11 illustrates the result obtained by controlling the disengagement hydraulic pressure in accordance with the closed loop illustrated in FIG. 7. FIG. 10 is a time chart illustrating a transition of the input shaft RPM nt upon the clutch-to-clutch shift operation while the lock-up clutch 22a has not been engaged. A solid line in FIG. 10 denotes a controlled result before modification, i.e. a controlled result in which the slip amount spluon is employed as the control slip amount sp regardless of the engagement condition of the lock-up clutch 22a. A broken line in FIG. 10 denotes a controlled result in which the slip amount spluoff is employed as the control slip amount sp. FIG. 11 is a time chart illustrating a transition of each rotation speed upon the clutch-to-clutch shift operation while the lock-up clutch 22a has not been engaged. A solid line in FIG. 11(A) represents the engine RPM ne, a broken line therein represents the input shaft RPM nt, a dashed line therein represents the output shaft RPM no (an actually measured value), and a chain double-dashed line therein represents a value obtained by multiplying the output shaft RPM no (the actually measured value) by the gear ratio before the shift operation. A solid line in FIG. 11(B) represents the target slip amount rslip, a broken line therein represents the actual slip amount spnama, and a dashed line therein represents the output from the reference model M(s).

As seen especially in FIGS. 11(A) and 11(B), according to the feedback control based upon the closed loop illustrated in FIG. 7, the ideal slip amount Mout can be relatively smoothly changed corresponding to a change of a slip amount which is considered to be ideal in response to the engagement condition of the lock-up clutch 22a. Therefore, the actual slip amount spnama can be changed corresponding to the ideal slip amount Mout outputted from the reference model M(s) even if a response delay (i.e. a control delay) occurs when the feedback control is performed by the feedback controller Cpi(s). Further, even if the feedback control Cpi(s) has been adapted for performing the clutch-to-clutch shift operation during the lock-up clutch 22a being engaged, the value corresponding to the input shaft RPM ne for obtaining the control slip amount sp is not fluctuated in favor of the notch filter NF along with the clutch-to-clutch shift operation when the lock-up clutch 22a has not been engaged, as illustrated by the broken line in FIG. 10. Therefore, the torque fluctuation of the output shaft of the transmission 30 may not occur and a favorable clutch-to-clutch shift operation can be executed.

Next, the gain of the controller Cpi(s) and the phase characteristics are described hereinbelow. The closed loop illustrated in FIG. 7 is assumed to be a controller with three inlets and a single outlet as illustrated in FIG. 12. In this case, a controller K(s) is expressed in accordance with the following formula 5 during the lock-up clutch 22a being engaged:

$$K(s)=Cpi(s) \cdot [M(s)-G1Lp3(s)Lp1(s)].$$

Therefore, an output u from the controller K(s) can be calculated based upon the inputs (rslip, no, nt) in accordance with the following formula 6:

$$u = K(s) \cdot \begin{bmatrix} rslip \\ no \\ nt \end{bmatrix} = Cpi(s) \cdot [M(s) \quad -G1Lp3(s) \quad Lp1(s)] \begin{bmatrix} rslip \\ no \\ nt \end{bmatrix}$$

The inner shaft RPM nt is applied with the low-pass filtering Lp1(s). Therefore, the transfer function from the input nt to the output u is obtained by Lp1(s)·Cpi(s). The gain of the transfer function and the phase characteristics thereof are expressed as illustrated in FIG. 13.

On the other hand, the input shaft RPM nt is applied with the notch filtering NF by the notch filter NF while the lock-up clutch 22a has not been engaged. Therefore, the relationship between the inputs (rslip, no, nt) and the output u from the controller K(s) can be expressed in accordance with the following formula 7:

$$u = Cpi(s) \cdot [M(s) \quad -G1Lp3(s) \quad NF \cdot Lp2(s)] \begin{bmatrix} rslip \\ no \\ nt \end{bmatrix}$$

The inner shaft RPM nt is applied with the notch filtering NF by the notch filter NF and the low-pass filtering Lp2(s) by the low-pass filter LP2 while the lock-up clutch 22a has not been engaged. In this case, the transfer function from the input nt to the output u can be obtained by NF·Lp2(s)·Cpi(s). Therefore, the gain of the transfer function and the phase characteristics thereof are expressed as illustrated in FIG. 14.

As described above, according to the embodiment of the present invention, the characteristics of the feedback controller Cpi(s) including the gain characteristics and the frequency characteristics are substantially switched by switching the third term of the controller K(s), i.e. by switching the value corresponding to the input shaft RPM nt for obtaining the control slip amount sp. In other words, there are two types feedback controllers prepared. The gain and frequency characteristics of one of the feedback controllers are not identical as the gain and frequency characteristics of the other one of the feedback controller. More specifically, one of the feedback controllers is adapted and employed for performing the clutch-to-clutch shift operation during the lock-up clutch 22a being engaged and the other one of the feedback controllers is adapted and employed for performing the clutch-to-clutch shift operation while the lock-up clutch 22a has not been engaged.

Next, operation of the control apparatus for controlling the shift operation in the automatic transmission 30 upon the clutch-to-clutch shift operation is described below by taking an shift-up operation from the second shift stage to the third shift stage as an example. The CPU of the electric control unit 50 (a clutch-to-clutch shift operation controlling means) repeatedly performs an interrupting routine explained by a flow chart illustrated in FIG. 15 every predetermined elapsed time (every 5 msec according to the embodiment of the present invention). The interrupting routine is started at step 1500 at a predetermined timing and proceeds to step 1505. At step 1505, the output shaft RPM no at the moment is set as an output shaft RPM no(k) of this time. The process then proceeds to step 1510 (an output shaft RPM obtaining means for obtaining the value corresponding to the output shaft RPM no) to apply the low-pass filtering LP3(s) to the output shaft RPM no via the low-pass filter LP3 in accordance with the following formula 8;

$$noflt(k) = \sum_{i=1}^{n} ai \cdot noflt(k-i) + \sum_{j=0}^{m} bj \cdot no(k-j)$$

At step 1510, a greater frequency component than the third frequency is removed from the output shaft RPM no, wherein a filtered output shaft RPM noflt(k) is obtained. The greater frequency component than the third frequency corresponds to fluctuation due to intolerance of a driving circuit, i.e. sensor noise. Therefore, the fluctuation of the slip amount due to the fluctuation of the intolerance of the driving circuit can be removed from the control slip amount sp. Therefore, the slip amount feedback control can be stabilized and the clutch-to-clutch shift operation can be smoothly performed. The variable k employed by the formula 8, formulas 9 and 10 (both described later) represents that the value with the variable k was obtained through this calculating cycle. The variable k−i represents that the value with the variable k−1 was obtained through a calculating cycle which was performed i times before this calculating cycle. The values n and m are integral numbers.

The CPU then proceeds to step 1515 for setting the input shaft RPM nt at the moment as an input shaft RPM nt(k) of this time. At step 1520 (an input shaft RPM nt obtaining means for obtaining the value corresponding to the output shaft RPM no), the input shaft RPM nt is applied with the low-pass filtering LP1(s) via the first low-pass filter LP1 in accordance with the following formula 9;

$$ntflt(k) = -\sum_{i=1}^{n} ci \cdot ntflt(k-i) + \sum_{j=0}^{m} dj \cdot nt(k-j)$$

At step 1520, the frequency component being greater than the first frequency is removed from the input shaft RPM nt. The first frequency is set to be substantially equal to or slightly smaller than the frequency of the sensor noise detected by the input shaft RPM sensor 63. Therefore, A filtered input shaft RPM ntflt (k) can be obtained by removing the sensor noise and so on from the input shaft RPM nt.

The CPU proceeds to step 1525 (an input shaft RPM notch filtering means) for applying the notch filtering NF to the input shaft RPM nt via the notch filter NF for removing the frequency component in the frequency domain adjacent to the predetermined notch frequency, wherein the notch filtered primary input shaft RPM ntnotch0 is obtained. Therefore, when the lock-up clutch 22*a* has not been engaged, the fluctuating component contained in the input shaft RPM nt can be removed by the slip amount feedback control by the feedback controller Cpi(s). The fluctuation removed by the notch filtering NF is caused due to the condition that the inertia of the input shaft 31 while the lock-up clutch 22*a* has not been engaged becomes smaller than the inertia thereof during the lock-up clutch 22*a* being engaged.

The CPU further proceeds to step 1530 for removing the frequency component substantially equal to or greater than the second frequency which is contained in the notch filtered primary input shaft RPM ntnotch0. The frequency component is removed by the second low-pass filter LP2 illustrated in FIG. 7. Therefore, the notch filtered input shaft RPM ntnotch can be obtained by removing the sensor noise and so on from the notch filtered primary input shaft RPM ntnotch0. The CPU then proceeds to step 1535 for calculating the actual slip amount spnama in accordance with the following formula 10;

$$spnama = nt - no \cdot G1,$$

and the interrupting routine is terminated at step 1595;

Meanwhile, the CPU has repeatedly performed another routine for controlling the disengagement hydraulic pressure explained by a flow chart illustrated in FIG. 16 every predetermined elapsed time. This routine is started at step 1600 at a predetermined timing and proceeds to step 1605. At step 1605, the CPU judges whether or not the second shift stage is in a state to be up-shifted to the third shift stage based upon the operation status point defined by the output shaft RPM no and the throttle opening degree th. If the second shift stage is not in the state to be up-shifted to the third shift stage, i.e. if the operation status point has not crossed the shift-up line from the second shift stage to the third shift stage, a negative judgment NO is obtained at step 1605 and the CPU proceeds to step 1695 for terminating the routine for controlling the disengagement hydraulic pressure. On the other hand, if the second shift stage is in the state to be up-shifted to the third shift stage, i.e. if the operation status point has crossed the shift-up line from the second shift stage to the third shift stage, an affirmative judgment YES is obtained at step 1605 and CPU proceeds to step 1610 for starting the initial ramp releasing control. More specifically, at step 1610, the disengagement indicating pressure PD is set to be a value obtained by subtracting a predetermined pressure SK from the line pressure PL. Therefore, the disengagement hydraulic pressure is reduced by the predetermined pressure SK in response to the excitement of the linear solenoid valve 44 (referring to the time t1 in FIG. 4).

The CPU proceeds to step 1615 for resetting a timer T1 and timing. At step 1620, the CPU repeatedly judges whether or not the value of the timer T1 is greater than a predetermined value TA. The disengagement indicating pressure PD is maintained at a constant pressure value while the value of the timer T1 is smaller than the predetermined TA (referring to a time interval between the times t1 and t2 in FIG. 4). The affirmative judgment YES is obtained at step 1620 when the value of the timer T1 becomes greater than the predetermined value TA. In this case, the CPU proceeds to step 1625 for resetting the value of the timer T1 and timing again. At step 1630, the actual slip amount spnama is monitored whether or not to be greater than zero value for judging whether or not the slip of the off-going friction engagement element has started.

If the off-going friction engagement element has been already slipped, the CPU proceeds to step 1650 for performing the slip amount feedback control. On the other hand, if the off-going friction engagement element has not been slipped, the CPU proceeds to step 1635 for judging whether or not the value of the timer T1 is greater than the predetermined value TA. In this case, it is immediately after timing by the timer T1 at step 1625, wherein the value of the timer T1 is smaller than the predetermined value TA. Therefore, the negative judgment NO is obtained at step 1635 and the CPU proceeds to step 1640 for reducing the value of the disengagement indicating pressure PD by a predetermined value α. The CPU then proceeds to step 1645 and returns to 1630 in a short time Δt from the pressure reduction at step 1640. As described above, the disengagement indicating pressure PD is reduced by the predetermined value α every Δt and the off-going friction engagement element is monitored whether or not it has been slipped (referring to a time interval between the time t2 and the time t3 in FIG. 4). The affirmative judgment YES is obtained at step 1630 if the slip of the off-going friction engagement element is started before the value of the timer T1 becomes greater than the predetermined value TA. The CPU then proceeds to step 1650 for starting the slip amount feedback control (referring to the time t3 in FIG. 4). On the other hand, if the slip is started with the value of the timer T1 being greater than the predetermined value TA, the affirmative judgment YES is obtained at step 1635 and the CPU proceeds to step 1655.

When the CPU proceeds to step 1650, a routine for performing the slip amount feedback control (a slip amount controlling means) explained by a flow chart illustrated in FIG. 17 is started. This routine is started at 1700 and the CPU proceeds to step 1705 for reading coefficients am1, am2, bm0, bm1, and bm2 of the reference model M(z) which has been discrete (Z-converted). At step 1710, the CPU read the proportional gain Kp of the feedback controller Cpi and the integral gain Ki thereof. At step 1715, the CPU reads the error feedback gain T. At step 1720, the value of the disengagement hydraulic pressure P at the moment is stored as a feedback initial value Pfb. The CPU then proceeds to step 1725 for calculating the difference between the output shaft RPM no and the low-pass filtered output shaft RPM noflt at the moment as the no offset amount nosa. At step 1730, the CPU calculates the difference between the input shaft RPM nt and the notch filtered input shaft RPM ntnotch at the moment as the nt offset amount ntsa.

At step 1735, the CPU judges whether or not the lock-up clutch 22a has been engaged, i.e. whether or not the slip amount of the lock-up clutch 22a is substantially equal to or smaller than a predetermined amount based upon the driving signal transmitted to the linear solenoid valve 47 from the electric control unit 50. When the lock-up clutch 22a has been engaged, the CPU proceeds to step 1740 for setting a value of a flag F at "1". When the lock-up clutch 22a has not been engaged, the CPU proceeds to step 1745 for setting the value of the flag F at "0". Therefore, when the slip amount feedback control is started, the flag F is set at "1" if the lock-up clutch 22a has been engaged and the flag F is set at "0" if the lock-up clutch 22a has not been engaged.

At step 1750, the CPU reads the target slip amount rslip(n). At step 1755, the ideal slip amount Mout(n) outputted from the reference model M(z) is calculated in accordance with the following formula 11;

$$Mout(n)=-am1 \cdot Mout(n-1)-am2 \cdot Mout(n-2)+bm0 \cdot rslip(n)+bm1 \cdot rslip(n-1)+bm2 \cdot rslip(n-2)$$

As illustrated in FIG. 6, the target slip amount rslip read at step 1750 is a slip amount which is increased in a stairstep manner from zero value to the predetermined value rs. The subscript n represents the sampling number of times.

The CPU then proceeds to step 1760 for judging whether or not the value of the flag F has been set at "1". When the value of the flag F is "1", the CPU proceeds to step 1765 for setting the slip amount spluon (=ntflt−(noflt+nosa)·G1) as the control slip amount sp. On the other hand, when the value of the flag F is "0", the CPU proceeds to step 1770 for setting the slip amount spluoff (=(ntnotch+ntsa)−(noflt+nosa)·G1) as the control slip amount sp. Each RPM ntflt, noflt, and ntnotch which all are employed at steps 1765 and 1770 have been updated every 5 msec by the routine illustrated in FIG. 15. Steps 1735, 1740, 1745, 1760, and 1770 serve as a control slip amount switching means.

At step 1775, the CPU calculates the error err by subtracting the control slip amount sp from the ideal slip amount Mout(n) outputted from the reference model M(z) and calculates an error feedback amount EFB(n) by multiplying the error err by the value of T. At step 1780, the CPU calculates an input Plin(n) inputted to the feedback controller Cpi by subtracting the control slip amount sp from the sum of the output Mout(n) and the error feedback amount EFB(n). At step 1785, the CPU calculates an output Plout(n) outputted from the feedback controller Cpi in accordance with the formula 12;

$$Plout(n)=Kp \cdot Plin(n)+Ki(Plout(n-1)+(SMPLT/2)*(Plin(n)+Plin(n-1))).$$

The formula 12 corresponds to a discrete formula 2. The value SMPLT represents a sampling period of time.

At step 1790, the CPU sets a sum of the output Plout(n) outputted from the feedback controller Cpi and the feedback initial value Pfb as an indicating pressure Psiji and outputs the indicating pressure Psiji for controlling the torque transmitted to the off-going friction engagement element. Therefore, the disengagement hydraulic pressure is controlled corresponding to the indicating pressure Psiji. The CPU then proceeds to step 1792 for judging whether or not the actual slip has vanished based upon the actual slip amount spnama. In this case, it is immediately after the slip of the off-going friction engagement amount started. The hydraulic pressure supplied to the on-coming friction engagement element is small so that the torque transmitting via the on-coming friction engagement element has not been started. Therefore, the actual slip amount spnama is greater than zero value so that the negative judgment NO is obtained at step 1792 and the CPU proceeds to step 1794 and returns to step 1750 in the sampling period of time SMPLT. As a result of the above-described slip amount feedback control, the actual slip amount spnama is smoothly increased for approximately corresponding to the output from the reference model M(s) as illustrated by a time interval between the times t3 and t4 in FIG. 4(E). Therefore, the torque fluctuation of the output shaft 32 is small and a favorable shift feeling can be effectively achieved. The CPU repeatedly performs steps 1750 through 1794 until the actual slip amount spnama becomes zero value.

Meanwhile, the CPU of the electric control unit 50 has repeatedly performed another routine for controlling the engagement hydraulic pressure as explained by a flow chart illustrated in FIG. 18. The CPU starts this routine at a predetermined timing from step 1800 and proceeds to step 1805 for judging whether or not the second shift stage is in the state to be up-shifted to the third shift stage in the same manner as step 1605. If the second shift stage is not in the state to be up-shifted to the third shift stage, the negative judgment NO is obtained at step 1805 and the CPU proceeds to step 1895 for terminating this routine.

However, if the second shift stage is in the state to be up-shifted to the third shift stage, the affirmative judgment YES is obtained at step 1805 and the CPU proceeds to step 1810 for setting the engagement indicating pressure PE at a predetermined precharge pressure PRCH (hereinafter, referred to as the line pressure PL) for performing the precharge control. Accordingly, the engagement hydraulic pressure is increased within a time interval from the time t1 to the time t2 as illustrated in FIG. 4(B) and oil is filled in oil passages and so on. At step 1815, a value of a timer T2 is reset and the timing is started. At step 1820, the CPU judges whether or not the value of the timer T2 is greater than a predetermined value tprch. If the value of the timer T2 is smaller than the predetermined value tprch, the CPU repeatedly performs step 1820. When the value of the timer T2 becomes greater than the predetermined value tprch, the CPU proceeds to step 1825 for setting the engagement indicating pressure PE at a predetermined maintained pressure PTAIKI. The CPU further proceeds to step 1830 for monitoring whether or not the actual slip amount spnama is greater than zero value. As described above, if the predetermined elapsed time TA has passed since the up-shift timing from the second shift stage to the third shifts stage, the reduction of the disengagement hydraulic pressure is started. Therefore, the slip of the off-going friction engagement element is started at the time t3 as illustrated in FIG. 4(E). Therefore, the affirmative judgment YES is obtained at step 1830 and the CPU proceeds to step 1835 for setting the disengagement indicating pressure PE at a predetermined pressure value PTANA being greater than the maintained pressure PTAIKI. The CPU judges at step 1840 whether or not the actual slip amount spnama is zero. The torque transmitting via the on-coming friction engagement element is started in a predetermined period of time in response to the increase of the actual engagement hydraulic pressure. Therefore, the reduction of the actual slip amount spnama is started.

While the above-described engagement hydraulic pressure control routine has been performed, the disengagement hydraulic pressure has been controlled by the slip amount feedback control executed by the feedback controller Cpi(s). According to the slip amount feedback control, the disengagement hydraulic pressure is controlled for maintaining the control slip amount sp at a target slip amount (i.e. the ideal slip amount Mout). Therefore, when the control slip amount sp is reduced along with the increase of the engagement hydraulic pressure, the disengagement hydraulic pressure (the disengagement indicating pressure PD) is reduced for increasing the control slip amount sp.

When the actual slip amount becomes zero along with the increase of the torque transmitted via the on-coming friction engagement element, the CPU proceeds to step 1845 (an inertia feedback control), in which the engagement hydraulic pressure is controlled for matching the change rate of the input shaft RPM nt Δnt with the target RPM change rate ΔMNT. The CPU further proceeds to step 1850 for judging whether or not the input shaft RPM nt corresponds to the value calculated by multiplying the output shaft RPM no by the gear ratio G2 of the third shift stage. When the negative judgment NO is obtained at step 1850, the CPU returns to step 1845. When the affirmative judgment YES is obtained at step 1850, the CPU proceeds to step 1855 for setting the engagement indicating pressure PE at the line pressure PL level. The CPU then proceeds to step 1895 for terminating the engagement hydraulic pressure control routine.

As illustrated in FIG. 4(E), the affirmative judgment YES is obtained at step 1792 when the actual slip amount spnama becomes zero value. The CPU then proceeds to step 1655 illustrated in FIG. 16 via step 1795 illustrated in FIG. 17 for setting the disengagement indicating pressure PD at zero value. The CPU then proceeds to step 1695 for terminating the disengagement hydraulic pressure control routine. As described above, the clutch-to-clutch shift operation according to the embodiment of the present invention is performed.

The affirmative judgment YES is obtained at step 1635 if the slip of the off-going friction engagement element was not started before the value of the timer T1 exceeds the predetermined value TA. The CPU then proceeds to step 1655. In this case, the slip of the off-going friction engagement element has not been started yet although the disengagement hydraulic pressure supplied to the off-going friction engagement element was sufficiently reduced. Therefore, it is considered that the rise of the input shaft RPM nt may not occur even if the disengagement hydraulic pressure was rapidly reduced without generating the slip.

As described above, according to the embodiment of the present invention, the control slip amount sp, i.e. the value corresponding to the input shaft RPM nt for obtaining the control slip amount sp) is witched in accordance with the engagement condition of the lock-up clutch 22*a*. In this case, the gain of the controller including the feedback controller Cpi(s) and the phase characteristics (i.e. the proportional gain Kp and the integral gain Ki) are substantially switched corresponding to the inertia (load) of the input shaft 31 of the transmission 30. Therefore, the slip amount is not fluctuated regardless of the engagement condition of the lock-up clutch 22*a* so that the clutch-to-clutch shift operation can be smoothly performed.

Further, even if the gain of the feedback controller Cpi(s) and the phase characteristics (i.e. the proportional gain Kp and the integral gain Ki) has been adapted for performing the clutch-to-clutch shift operation during the lock-up clutch 22*a* being engaged, the torque fluctuation of the output shaft 32 of the transmission 30 may not occur along with the clutch-to-clutch shift operation while the lock-up clutch 22*a* has not been engaged. Therefore, labor and energy for adapting the feedback controller Cpi(s) can be effectively reduced and the manufacturing cost can be also reduced.

Still further, according to the embodiment of the present invention, the reference model M(s) outputs the target slip amount (i.e. the ideal slip amount Mout) which is smoothly increased from zero value up to the ultimate target slip amount rslip. The actual slip amount spnama hence can be ideally increased/changed even when the torque transmitted via the on-coming friction engagement element is increased being delayed from the prescribed timing due to fluctuation of the clutch stroke of the on-coming friction engagement element, variation of oil pressure characteristics, or the like. Therefore, a favorable shift feeling can be assured. Further, according to the embodiment of the present invention, the feedback control is performed with the error err. Therefore, even if characteristics of the controlled object P(s) fluctuate due to the manufacturing error, the fluctuation can be automatically corrected.

The present invention is not necessarily limited to the above-described preferred embodiment and can be applicable to various modifications without departing from the spirit of the present invention. For example, according to the embodiment of the present invention, the clutch-to-clutch shift operation is performed from the second shift stage to the third shift stage. However, the clutch-to-clutch shift operation of the present invention can be performed from another shift stage. The proportional gain Kp of the feedback controller Cpi(s), the integral gain Ki thereof, and the gain T of the error feedback controller Cef are stored in the ROM in advance in accordance with the type of shift operation and are read out corresponding to the actually selected shift operation so as to perform the desirable shift operation.

According to the embodiment of the present invention, the characteristics of the feedback controller Cpi(s) can be substantially switched by changing the filtering process applied to the input shaft RPM nt. However, it is also preferable to prepare a feedback controller which has two different characteristics each of which is applicable for the condition in that the lock-up clutch 22*a* has been engaged and for the other condition in that the lock-up clutch 22*a* has not been engaged. Any one of the two different characteristics is selected corresponding the engagement condition of the lock-up clutch 22*a* so as to execute the above-described feedback control, i.e. the clutch-to-clutch shift operation.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A control apparatus for controlling a shift operation in an automatic transmission performing a predetermined shift stage by maintaining respective plural friction engagement elements to be engaged or disengaged comprising:

a fluid type transmitting mechanism (21) for transmitting an output from a vehicle driving power source to the automatic transmission;

a lock-up clutch (22) disposed in parallel to the fluid type transmitting mechanism, the lock-up clutch (22) adapted to be engaged or not to be engaged for transmitting the output from the driving power source to the automatic transmission during the lock-up clutch at least being engaged;

a lock-up clutch controlling means (50) for controlling the lock-up clutch to be engaged or not to be engaged in accordance with a vehicle driving condition; and a clutch-to-clutch shift operation controlling means (50) for generating a slip by reducing torque transmitted via an off-going friction engagement element and performing a shift operation by increasing torque transmitted via an on-coming friction engagement element, the off-going friction engagement element included in the plural friction engagement elements and switched from the engaged condition to the disengaged condition along with the shift operation from a shift stage to the other shift stage, and the on-coming friction engagement element also included in the plural friction engagement elements and switched from the disengaged condition to the engaged condition along with the shift operation from the shift stage to the other shift stage;

the clutch-to-clutch shift operation controlling means including:

an input shaft rotation speed obtaining means (step 1520) for obtaining a value corresponding to a rotation speed of an input shaft of the automatic transmission;

an output shaft rotation speed obtaining means (step 1510) for obtaining a value corresponding to a rotation speed of an output shaft of the automatic transmission; and a slip amount controlling means (step 1650 and 1700) having a feedback controller for controlling the torque transmitted via the off-going friction engagement element for matching a control slip amount obtained based upon the values corresponding to the input shaft rotation speed and the output shaft rotation speed with a predetermined target slip amount and switching a gain of the feedback controller and phase characteristics thereof in response to the engagement condition of the lock-up clutch.

2. A control apparatus for controlling a shift operation in the automatic transmission according to claim 1, wherein the slip amount controlling means further includes;

a notch filtering means (1525) for obtaining a notch filtered input shaft rotation speed by applying a notch filtering process for removing frequency component in a predetermined frequency domain to the value corresponding to the input shaft rotation speed obtained by the input shaft rotation speed obtaining means, wherein the slip amount controlling means substantially switches the gain of the feedback controller and the phase characteristics thereof by obtaining the control slip amount based upon the value corresponding to the input shaft rotation speed prior to be applied with the notch filtering process and the value corresponding to the output shaft rotation speed during the lock-up clutch being engaged and based upon the notch filtered input shaft rotation speed and the value corresponding to the output shaft rotation speed obtained by the output shaft rotation speed obtaining means while the lock-up clutch has not been engaged.

3. A control apparatus for controlling a shift operation in the automatic transmission according to claim 2, wherein the slip amount controlling means obtains the control slip amount based upon a value obtained by adding a predetermined offset amount into the notch filtered input shaft rotation speed while the lock-up clutch has not been engaged.

4. A control apparatus for controlling a shift operation in the automatic transmission according to claim 3, wherein the slip amount controlling means sets the offset amount based upon a difference between the notch filtered input shaft rotation speed and the value corresponding to the input shaft rotation speed when the slip is initiated along with the clutch-to-clutch shift operation.

* * * * *